(12) United States Patent
Oz et al.

(10) Patent No.: US 11,030,569 B2
(45) Date of Patent: Jun. 8, 2021

(54) PACKAGE EXCHANGE SERVICE USING LOCAL DELIVERY SERVICES

(71) Applicant: Continental Intelligent Transportation Systems, LLC, Santa Clara, CA (US)

(72) Inventors: Seval Oz, San Jose, CA (US); Tammer Zein-El-Abedein, Campbell, CA (US); Yao Zhao, Fremont, CA (US)

(73) Assignee: Continental Intelligent Transportation Systems, Inc., Santa Clara, CA (US)

( * ) Notice: Subject to any disclaimer, the term of this patent is extended or adjusted under 35 U.S.C. 154(b) by 527 days.

(21) Appl. No.: 15/753,481

(22) PCT Filed: Aug. 22, 2016

(86) PCT No.: PCT/US2016/047967
§ 371 (c)(1),
(2) Date: Feb. 19, 2018

(87) PCT Pub. No.: WO2017/035052
PCT Pub. Date: Mar. 2, 2017

(65) Prior Publication Data
US 2018/0240067 A1    Aug. 23, 2018

Related U.S. Application Data

(60) Provisional application No. 62/209,229, filed on Aug. 24, 2015.

(51) Int. Cl.
*H04L 29/00* (2006.01)
*G06Q 10/08* (2012.01)
(Continued)

(52) U.S. Cl.
CPC ....... *G06Q 10/0833* (2013.01); *G06F 16/951* (2019.01); *G06Q 10/08* (2013.01);
(Continued)

(58) Field of Classification Search
CPC ... G06Q 10/0833; G06Q 10/08; G06F 16/951
(Continued)

(56) References Cited

U.S. PATENT DOCUMENTS

2008/0275643 A1    11/2008    Yaqub et al.
2012/0101914 A1*    4/2012    Kumar ............... G06Q 30/0633
                                              705/26.8
(Continued)

OTHER PUBLICATIONS

InFin ID Technologies/ RFID Tracking Tracing Software website/ 2015/ https://www.infinidtech.com/?gclid= CjwKCAiA7939BRBMEiwA-hX5J5WSq2DD6YyHoQx-ulnJV3Vs3xhUVyxV2Gv_C07h3NMX2nY8YeKNpRoCeGEQAvD_BwE (Year: 2015).*

(Continued)

*Primary Examiner* — Morshed Mehedi
*Assistant Examiner* — Michael D Anderson

(57) ABSTRACT

A cloud-based package-exchange-service for package delivery to, and pick-up from, a target vehicle includes a GPS-based proximity module. The GPS-based proximity module receives current GPS coordinates of a package delivery vehicle and of the target vehicle. The GPS-based proximity module stores both GPS coordinates. The GPS-based proximity module monitors a distance between the package delivery vehicle and the target vehicle of the customer. The cloud-based system also has a delivery module in the first server associated with a second database. The delivery module includes one or more lists of local delivery services that include registered individuals to be assigned for package exchange operations. The lists of local delivery services also include package delivery restrictions and conditions including package size, hours of operation, distance to operate, and delivery prices.

8 Claims, 31 Drawing Sheets

(51) Int. Cl.
  *G06F 16/951* (2019.01)
  *G06Q 30/06* (2012.01)
  *G07C 9/00* (2020.01)
  *H04W 12/08* (2021.01)
  *G06K 7/10* (2006.01)

(52) U.S. Cl.
  CPC ..... *G06Q 30/0611* (2013.01); *G07C 9/00182* (2013.01); *H04W 12/08* (2013.01); *G06K 7/10297* (2013.01); *G06Q 30/0641* (2013.01); *G07C 2009/00198* (2013.01)

(58) Field of Classification Search
  USPC .......................................................... 726/7
  See application file for complete search history.

(56) References Cited

U.S. PATENT DOCUMENTS

| | | | |
|---|---|---|---|
| 2014/0180959 A1* | 6/2014 | Gillen | G06Q 50/01 |
| | | | 705/341 |
| 2015/0120598 A1* | 4/2015 | Fadell | G06Q 10/0631 |
| | | | 705/333 |
| 2015/0156747 A1 | 6/2015 | Skaaksrud et al. | |

OTHER PUBLICATIONS

Tammy Trimble, Darrell Bowman/Market Guide to Fleet Telematics/Dec. 21, 2012/Transportation Institue/pp. 1-59 (Year: 2012).*
International Search Report and Written Opinion dated Nov. 4, 2016 from corresponding International Patent Application No. PCT/US2016/047967.

* cited by examiner

- BOX2GO TELEMATICS VALUE PROPOSITION
  > THE PRIORITY PACKAGE PROBLEM
  WHAT HAPPENS WHEN YOU ARE NOT AT HOME?

PRIORITY PACKAGE

DELIVERY PERSON

- MISSED DELIVERY

TO PICK UP YOUR PACKAGE(S) TODAY:

3700 SOUTH ROBERTSON BOULEVARD
  LOS ANGELES, CA 90034

BUSY AT WORK

- WHAT ARE YOUR OPTIONS?
- CARRIER
  -ATTEMPT RE-DELIVERY
- YOU
  - RELEASE LIABILITY
  -WAIT FOR IT AT HOME, OR
  -PICK IT UP AT NIGHT

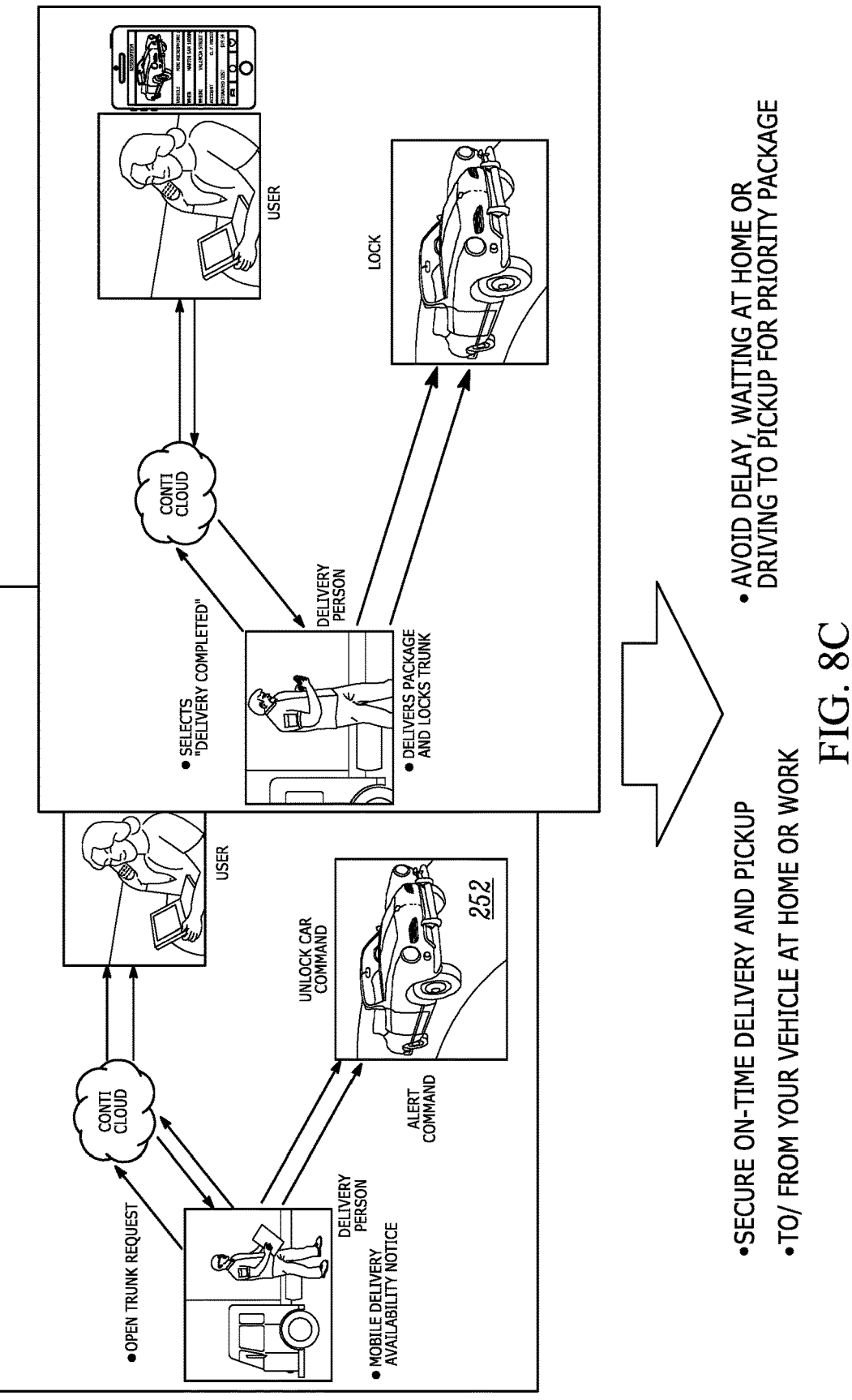

FIG. 13

PACKAGE EXCHANGE SERVICE USING LOCAL DELIVERY SERVICES

FIELD

The design generally relates to a package exchange (delivery to and pick-up from) a vehicle system.

BACKGROUND

Typically, shipments are usually sent to the home address of the person concerned. This technology instead delivers packages to or picks-up a package inside a customer's vehicle while ensuring safe delivery at the exchange location.

SUMMARY

In general, a cloud based system for a package exchange to and from a target vehicle service is described. The cloud-based system has a cloud-based package-exchange-service hosted on a cloud based provider site that includes one or more servers. Each server has one or more processors. The servers are configured to communicate with one or more databases in the cloud based provider site. The cloud-based system has a GPS-based proximity module in a first server associated with package-exchange-service. The GPS-based proximity module is configured to receive both current GPS coordinates of a package delivery vehicle and current GPS coordinates of the target vehicle of a customer for at least one package exchange operation to the target vehicle of the customer. The GPS-based proximity module is configured to store both GPS coordinates in a first database of the cloud based provider site. The GPS-based proximity module is configured to monitor a distance between the package delivery vehicle and the target vehicle of the customer. The cloud-based system also has a delivery module in the first server associated with a second database of the cloud-based system. The delivery module includes one or more lists of local delivery services. The one or more lists of local delivery services include registered individuals to be assigned for package exchange operations. The one or more lists of local delivery services also include package delivery restrictions and conditions including package size, hours of operation, distance to operate, and delivery prices. The customer is configured to search and select a local delivery service. The cloud-based system has a security module in the first server associated with the package-exchange-service. The security module is configured to setup at least one package exchange operation. The package exchange operation includes 1) directing the package delivery vehicle to the target vehicle of the customer, 2) opening and/or unlocking the target vehicle of the customer to ensure the at least one package exchange operation can be performed with the target vehicle of the customer, 3) ensuring the at least one package exchange operation have been performed, and 4) after performing the at least one package exchange operation, ensuring the target vehicle of the customer is closed and locked and the at least one package exchange operation is complete. The security module in cooperation with the GPS-based proximity module is further configured to send one or more functional commands to the target vehicle of the customer. The commands include 1) to wake-up an on-board actuation module in the target vehicle of the customer while in a close proximity established by a first threshold distance between the package delivery vehicle and the target vehicle of the customer, 2) to give an alert from the target vehicle of the customer while in a close proximity established by a second threshold distance between the package delivery vehicle and the target vehicle of the customer, 3) to unlock a door of the target vehicle of the customer, and 4) to lock the doors of the target vehicle of the customer after receiving a confirmation of a completion of the at least one package exchange operation.

In an embodiment, the cloud-based package-exchange-service hosted on a cloud based provider site contains two or more servers and two or more databases. The cloud-based package-exchange-service uses two or more paired-virtual keys, such as a dual-key protection mechanism, via secure key matching authentication in order to render hacking any single system's server useless. The dual keys may be a public-private key and a token generated only when a user authenticates they want a delivery to their vehicle. Additionally, the virtual keys are given a shelf life to limit authorized package delivery and subsequent activation of the vehicle's actuation module to within a specified time window.

In an embodiment, the cloud-based package-exchange-service hosted on a cloud based provider site contains two or more servers and one or more databases. The cloud based package-exchange-service uses a Global Positioning System (GPS)-based proximity system to control and track the package delivery operation, to speed up the package delivery operation, and to ensure security for the package delivery operation. The cloud-based package-exchange-service also uses a mobile delivery notice to verify the origination of the package delivery order as well as to communicate a successful package exchange operation (see, for example, FIG. 12).

In an embodiment, a method for an alternative package pickup and delivery system includes a number of example steps. The consumer while shopping at a retail store, at checkout, can purchase one or more selected products on a retail website. The consumer is offered on the user interface at checkout an alternative package delivery option to have the purchased products delivered to a vehicle using a cloud-based package-exchange-service. The consumer selects the delivery method offered on the user interface labeled as "Box2Go Delivery," to have the package delivered to the consumer's vehicle. The package-exchange-service processes the alternative package pickup and delivery option. A list of local delivery services is offered to the customer to choose a first local deliver service, such as Uber, a store delivery service, a delivery service provider like Fed Ex, or another similar local delivery service. The purchased products are delivered to the consumer's vehicle's location by the first local delivery service. The package-exchange-service opens the consumer's vehicle and ensures the purchased products have been delivered. The package-exchange-service ensures the consumer's vehicle is closed and locked when the purchased products have been delivered. Additionally, the customers can log into their account on the cloud based package-exchange-service website and being redirected to one or more websites to make the purchases.

BRIEF DESCRIPTION OF THE DRAWINGS

The multiple drawings refer to the example embodiments of the design.

FIGS. 8A-8D illustrate block and flow diagrams of embodiment of the value proposition of the alternative delivery system.

FIG. 13 illustrates a block diagram of an example retail/merchant site presenting a button on a user interface of a shopping application resident on the client device of the customer.

Figure 1:
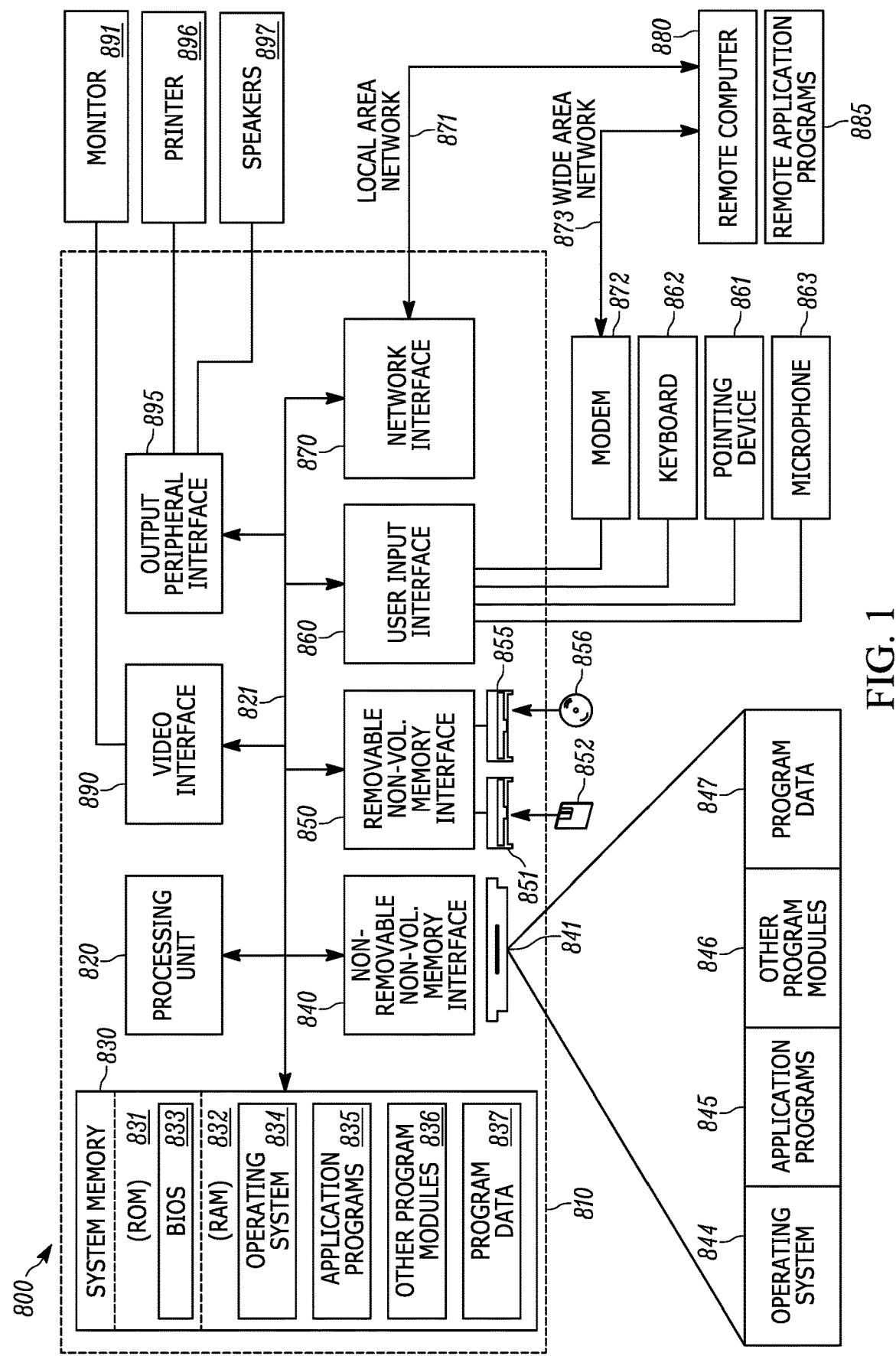
FIG. 1 illustrates a block diagram of an example computing system that may be used in an embodiment of one or more of the servers, in-vehicle electronic modules, and client devices discussed herein.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

Figure 10:
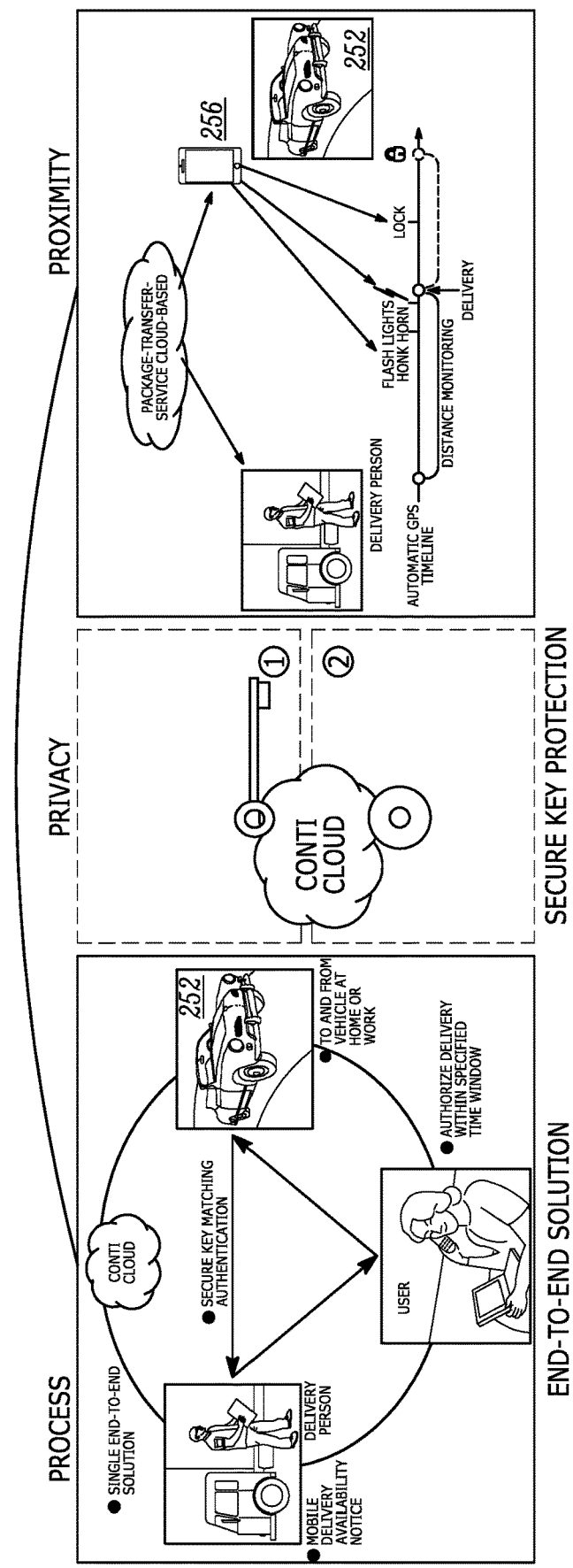
FIG. 10 illustrates a block diagram overview of an embodiment of the package-exchange-service hosted on a cloud-based and some of its features including i) process connectivity to multiple platforms, ii) built in privacy and security, and iii) a vehicle alert system via proximity.
Figure 11:
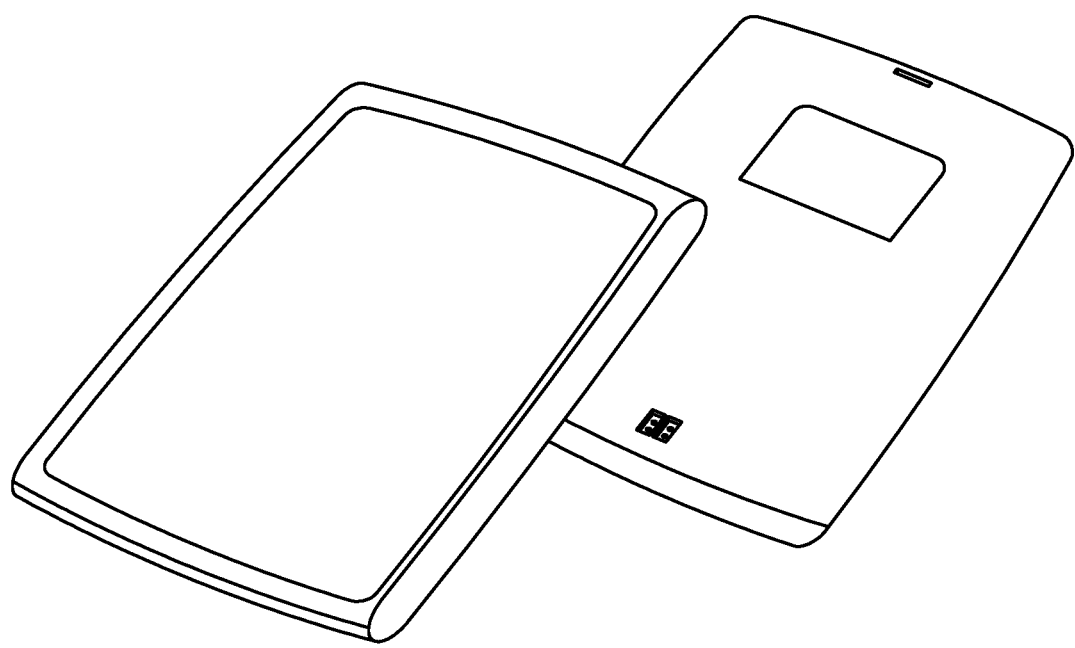
FIG. 11 illustrates the keys that can be attached to a client device (e.g., cell phone) of a delivery person for transmitting RF signals of a key fob.

In general, the package exchange a vehicle service facilitates package delivery to or pick up from a vehicle at home, work, or anywhere via a local delivery service. The package-exchange-service may be hosted on a cloud-based provider site. The package-exchange-service hosted on a cloud-based provider site may use an onboard actuation module for commanding the vehicle to perform an electro-mechanical action, such as locking and unlocking the vehicle, opening the trunk or a sunroof, etc. The package-exchange-service may use an already existing telematics module of the vehicle as the onboard actuation module or may install a dongle module as the actuation module. If the telematics system is used, the package-exchange-service can receive data such as GPS coordinates of the vehicle from the telematics module of the vehicle or can send command to the telematics module of the vehicle through the telematics provider. Alternatively, the package-exchange-service can use a dongle module having a Wi-Fi or cellular communication circuit configured to establish a secure communication with a cloud based system associated with the package-exchange-service. The dongle module can be coupled to an electro-mechanical activation circuit configured to cooperate with a fault and diagnostic module installed in the target vehicle of the customer in order to retrieve diagnostic data including the GPS coordinates of the vehicle of the user. The dongle module can also implement RF circuitry and to operate like a key fob simulator. Alternatively, the on-board actuation module of the target vehicle is an on-board RF module and the package-exchange-service can receive the GPS coordinates of the vehicle from a client device (e.g., a mobile phone) of the user and can supply a universal key fob simulator, such as a smart phone with an application, implementing appropriate RF frequencies, rolling security code, and commands to a client device of a package delivery vehicle (see, for example, FIG. 11). The package-exchange-service can use two or more paired-virtual keys, such as a dual-key protection mechanism, via a secure key matching authentication in order to render hacking any single system's server useless. Additionally, the virtual keys are given a shelf life to limit authorized package delivery and subsequent activation of the vehicle's actuation module to within a specified time window. The package-exchange-service may not store the user credentials in its databases and, in general, only encrypted data is transmitted from the cloud-based package-exchange-service and i) the applications resident on client devices, ii) the package delivery vehicles, and iii) the OEM telematics systems. The package-exchange-service uses a GPS-based proximity system to control and track the package exchange operation, to speed up the package exchange operation, and to ensure security for the package exchange operation. The package-exchange-service also uses a mobile delivery notice to verify the origination of the package delivery order as well as to communicate a successful package-exchange-service (see, for example, FIG. 12). The package-exchange-service coordinates deliveries of packages to wherever vehicle is parked, including the service can deliver services to a rental car while on business trip. See FIG. 10 for a block diagram overview of an embodiment of the package-exchange-service hosted on a cloud-based site and some of its features. The features include i) process connectivity to multiple platforms, ii) built in privacy and security, and iii) a vehicle awake and alert system via proximity. Additionally, the cloud based system for package exchange has, in a database, a list of local delivery services that include registered individuals to be assigned to package exchange operations. The customer is given a choice of selecting the package delivery vehicle from the set of lists of local delivery services, or do not choose the local delivery services and select a package delivery system such as FedEx. When choosing from the list of local delivery services, the customer may be given the choice to select a local delivery service based on cost. One or more local delivery sites each have one or more servers. Each server has one or more processors. The servers are configured to communicate with the servers of the cloud based package exchange service to facilitate a delivery of one or more packages to one or more target vehicles. The servers of the one or more local delivery sites and the servers of the cloud-based package-exchange-service are configured to exchange information. Each local delivery service establishes a set of standard commands between its server on its site and one or more servers on the cloud based package-exchange-service to exchange information including the GPS coordinates of the target vehicle, the package(s), and store distribution site to pick up the package from.

In an embodiment, the cloud based system for a package-exchange-service includes in a database one or more lists of local delivery services that have information of local driver services and drivers including names, addresses, and phone numbers, email addresses, reports and evaluations, hours of operation, costs. The list is searchable by the users to find the best price, suitable hours of delivery, reliability, etc. In an example, the prospective drivers can sign into the cloud-based system for the package-exchange-service and register. The list of local delivery services may also list a service such as Uber™ or UPS™ and then these systems are notified of one or more packages that need to be delivered. The local delivery service may also be a merchant's own delivery fleet of vehicles. Each local delivery service may be allowed to participate in a bidding process to deliver those packages.

Also, the universal key fob simulator, such as a smart phone or other handheld device, is configured with an antenna and transmission circuit to transmit at the specific frequency that the target car's Body Control Module is anticipating and configured to receive signals/commands at, such as 4.44 MHz. The Radio frequency transmitter can transmit in a range, for example, between 3 to 400 MHz using a series of phase-locked loop frequency control circuits. The Body Control Module has a receiver circuit tuned to a specific frequency, such as 4.44 MHz, corresponding to the frequency transmitter by the key fob simulator. The Body Control Module is located inside the target vehicle in order to unlock the vehicle needs to receive both one of 1) the rolling security key codes that is within the acceptable window of synchronization and 2) at the specific RF frequency from the universal key fob and 3) potentially one or more commands regarding the vehicle, such as unlock or transmit GPS coordinates. Both the universal key fob simulator and the Body Control Module can use the same pseudo-random number generator for the rolling security key codes. Alternatively, a backend server and database system uses the same pseudo-random number generator as the target vehicle and generates a set of rolling security key codes. The backend server sends merely the set of rolling security key codes to the universal key fob simulator. The universal key fob simulator is configured with an enhanced broadcast range, such as up to several hundred meters, compared to the broadcast strength of a typical key fob. The protocols and commands may be generated and stored locally on the universal key fob simulator. Alternatively, the protocols and commands may be also generated and stored by the backend server and database and then sent to the universal key fob simulator upon request.

Figure 2A:
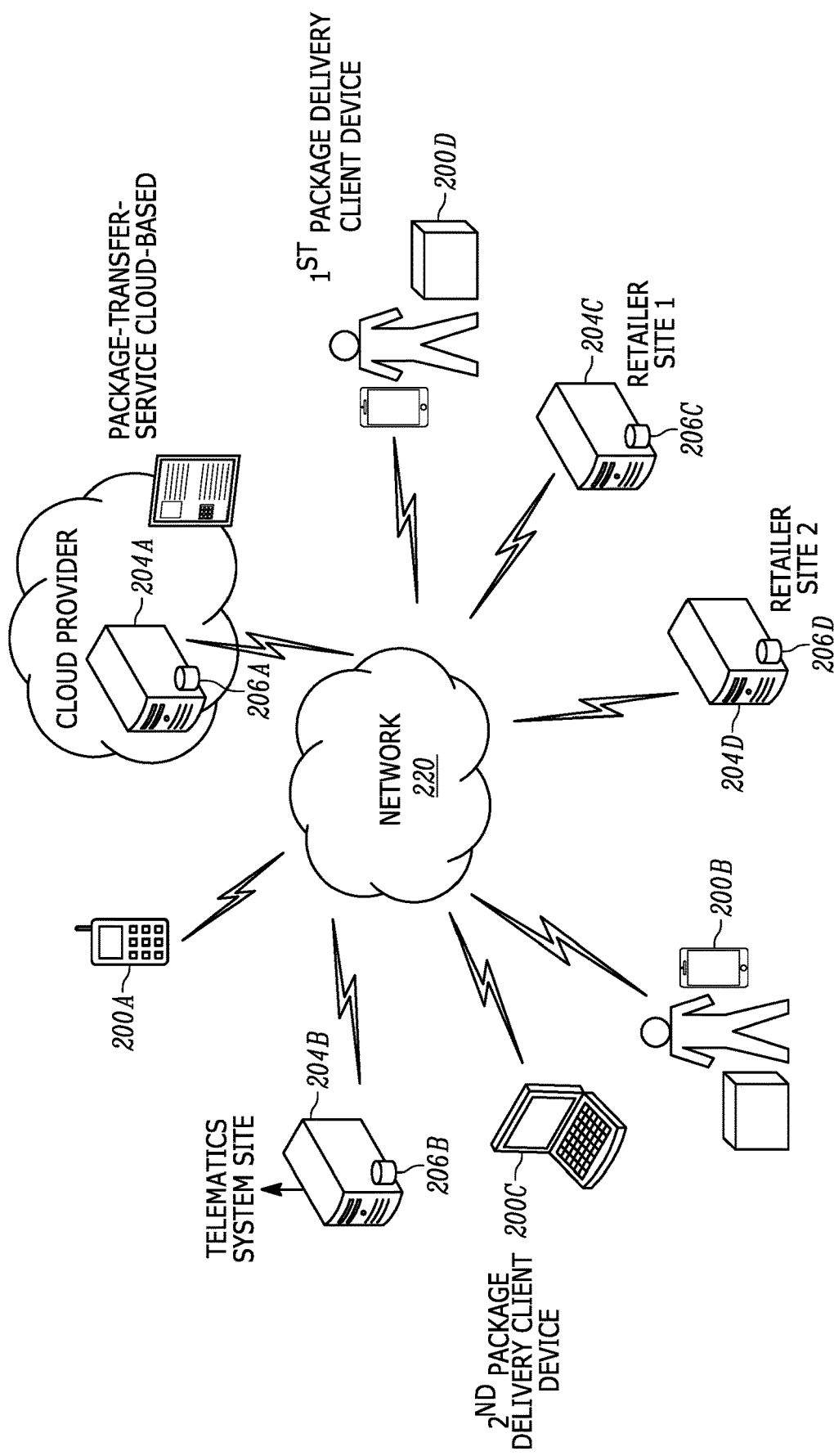
FIGS. 2A-2B illustrate block diagrams of embodiments of the package-exchange-service hosted on a cloud-based provider site.
Figure 2B:
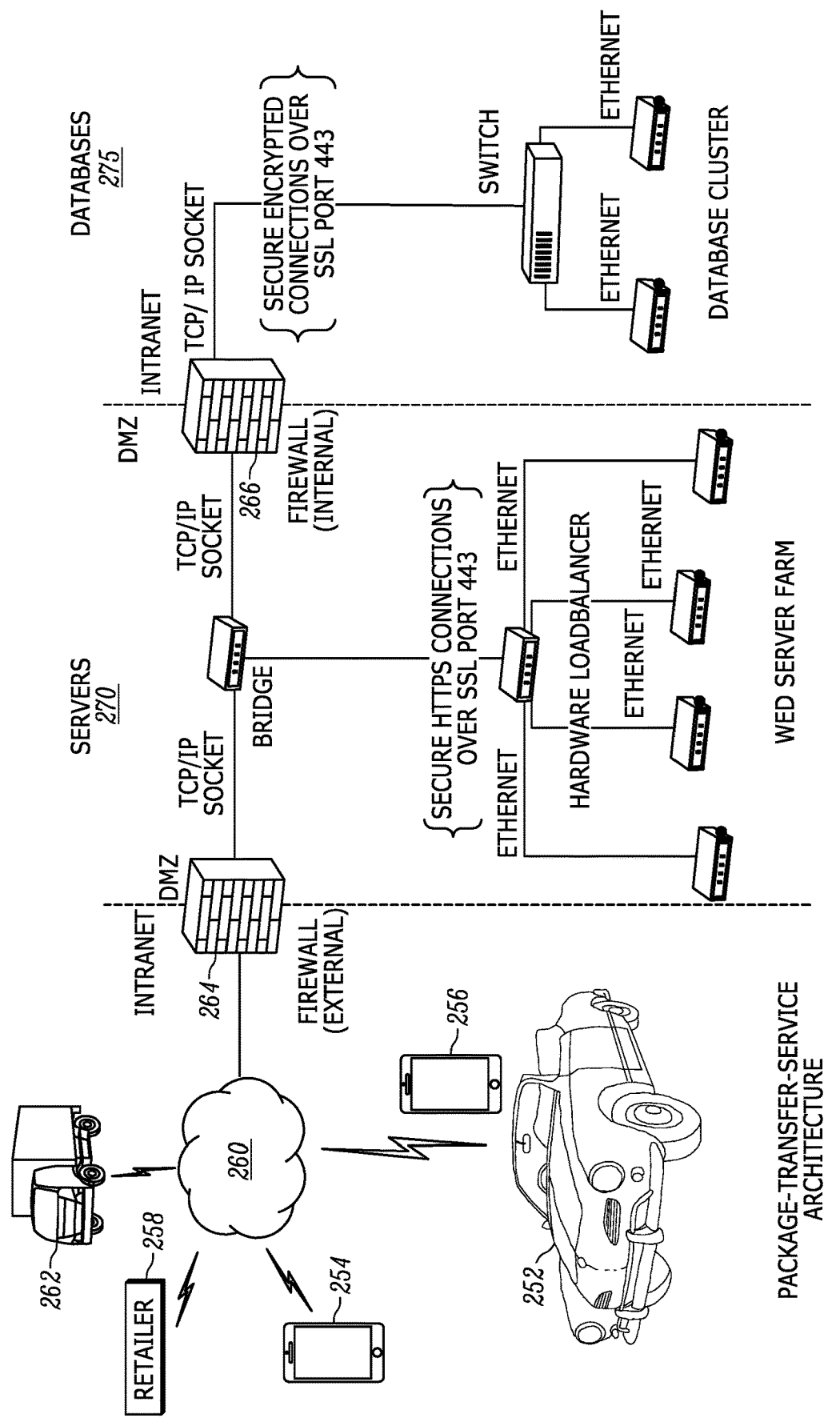

Example processes for and apparatuses to provide an automated process workflow for the entire cloud-based package-exchange-service using a local delivery service are described. The following drawings and text describe various example implementations of the design. FIG. 1 and FIGS. 2A-2B illustrate example environments to implement the concepts.

FIGS. 2A-2B illustrate block diagrams of embodiments of the package-exchange-service hosted on a cloud-based provider site. The web server farm may have examples of 4 servers and 2 database clusters. i) A user downloads and uses either i) a vehicle package delivery/pickup mobile application or ii) a vehicle package delivery/pickup desktop application on their client device to register with the package-exchange-service cloud system. The cloud-based package-exchange-service hosted on a cloud-based provider site contains one or more servers and one or more databases. The one or more databases store at least i) User ID and Password for the package-exchange-service, ii) User name, iii) email or contact phone number of the user, iv) Security questions, v) Vehicle VIN, vi) Vehicle make, model, color, year, and vii) any combination of at least three of these.

The cloud-based package-exchange-service cloud system can be implemented in software, hardware electronics, and any combination of both and when one or more portions of the system are implemented in software, then that software is tangibly stored in an executable format on the one or more non-transitory storage mediums to be executed by a processing component.

High-Level Description of Each Transaction in Case of Dongle Solution

Figure 3A:
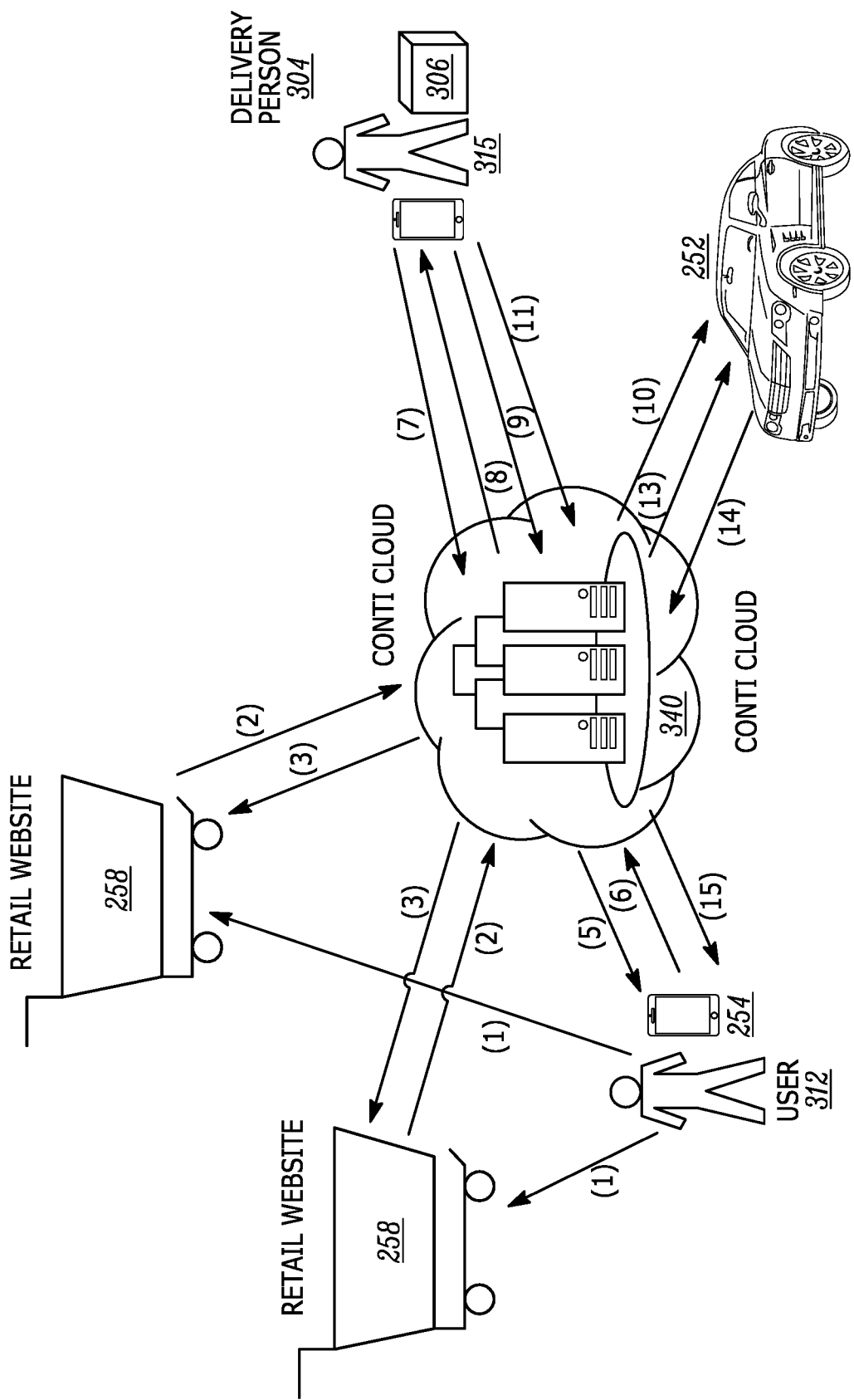
FIGS. 3A-3C illustrate block and flow diagrams of an embodiment of the alternative delivery system using an actuation module solution.
Figure 3B:
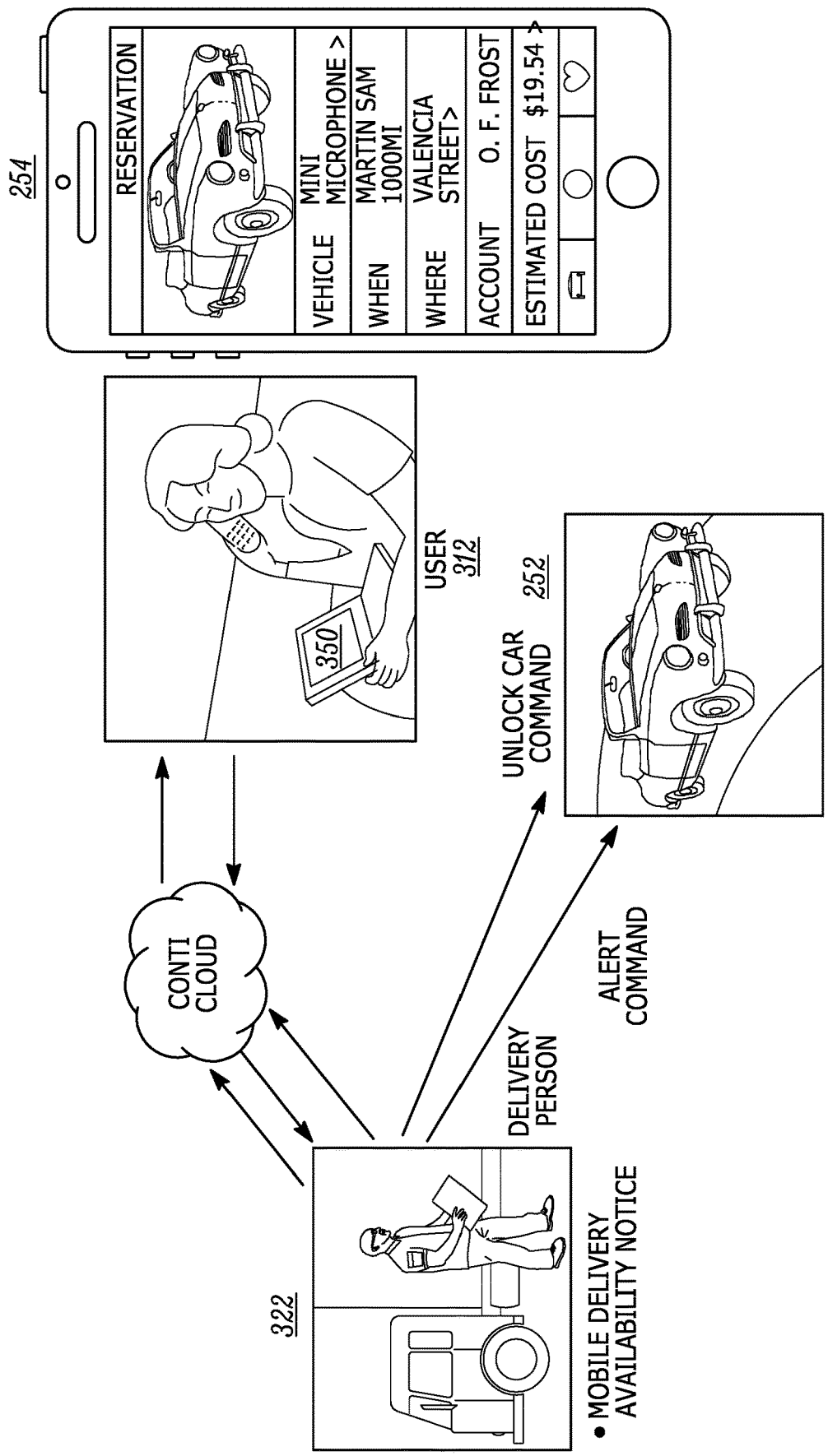
Figure 3C:
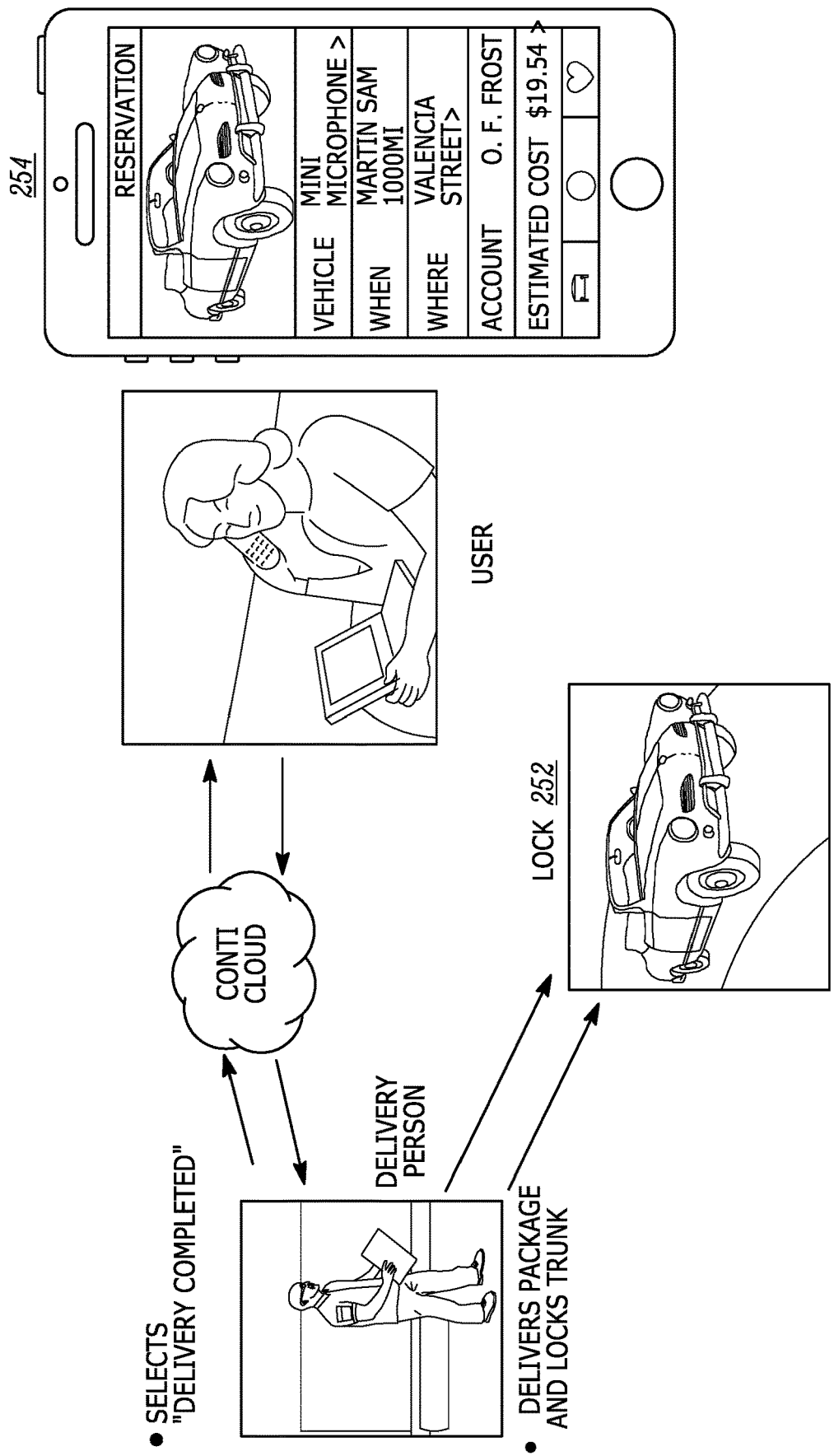

FIGS. 3A-C illustrate a flow diagram of an embodiment of the alternative package pickup and delivery system using an example dongle solution including sequence of steps.

In an embodiment, a dongle module having circuitry and a software application is configured to provide an intelligent and expanded use of navigation data to control other vehicle systems. Additional hardware, such as control wiring directly to the doors and trunk of the car, may be installed in the target vehicle to assist in the delivery operation by the local delivery service. The dongle module may be a small piece of hardware that attaches to the vehicle in order to enable additional functions.

An alternative package pickup and delivery system is discussed. The system includes a cloud-based package-exchange-service that is hosted on a cloud-based provider site. The user/customer is given a choice of selecting the package delivery vehicle from among the local delivery services, or do not choose the local delivery services and select a package delivery system such as FedEx. The system may also allow the cloud-based system for a package-exchange-service to put up a bid system with a number of deliveries and expected locations of a set of target vehicles, each with its one or more package deliveries. The local delivery services will then submit bids to the cloud based system for a package-exchange-service to win the right to deliver the packages. The user information, package information, store information, vehicle information and expected vehicle location information for each package delivery will be sent to the winning bidder. The servers of the cloud based system for a package-exchange-service in combination with an application on a smart phone or similar device will then guide the local delivery service to conduct the package exchange with each of the target vehicles using the dual key security process and the vehicle alert and access systems discussed herein.

Figure 5A:
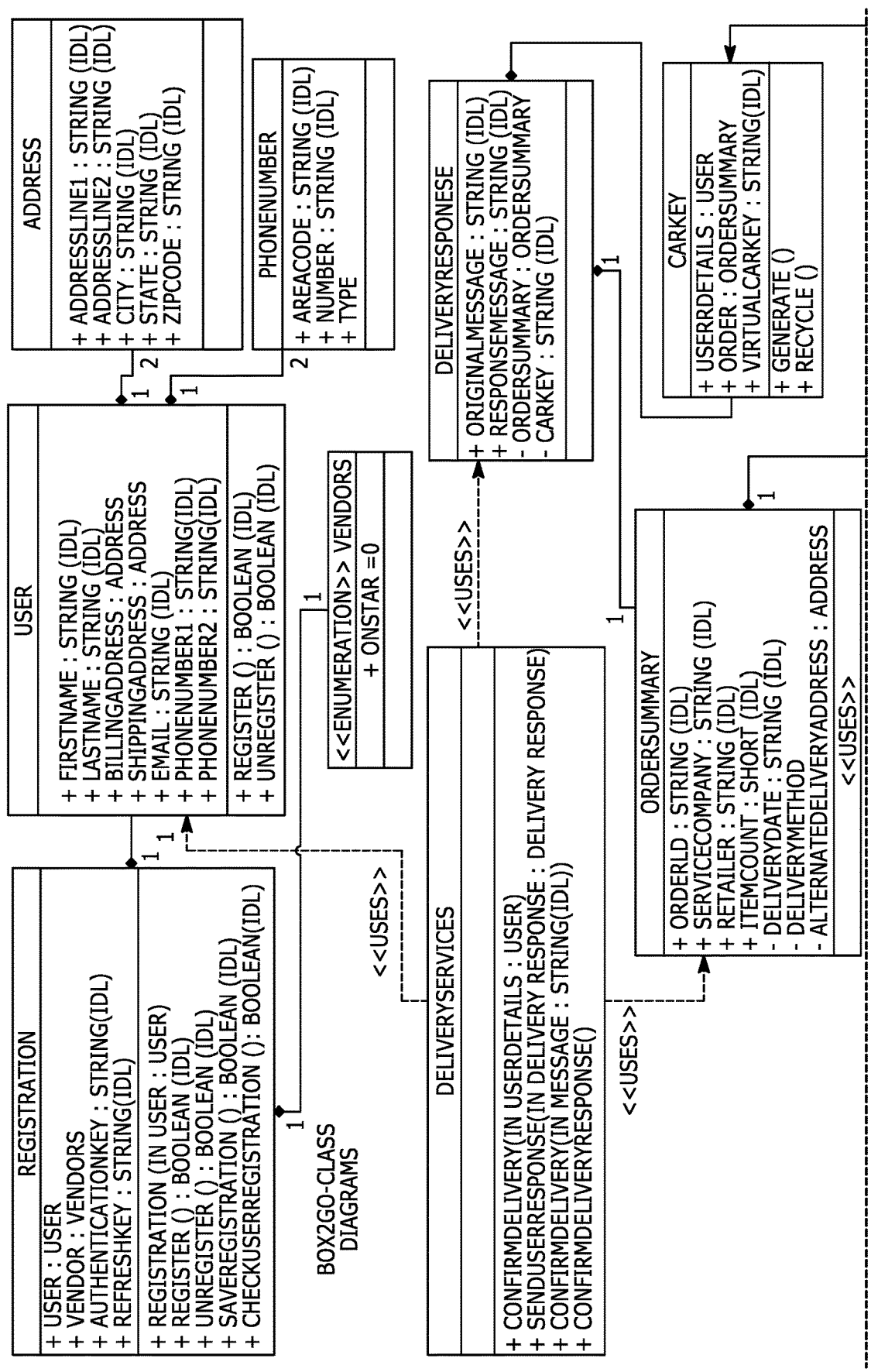
FIG. 5 illustrates an example class diagram of an embodiment of an application programming interface for the alternative package pickup and delivery system.
Figure 5B:
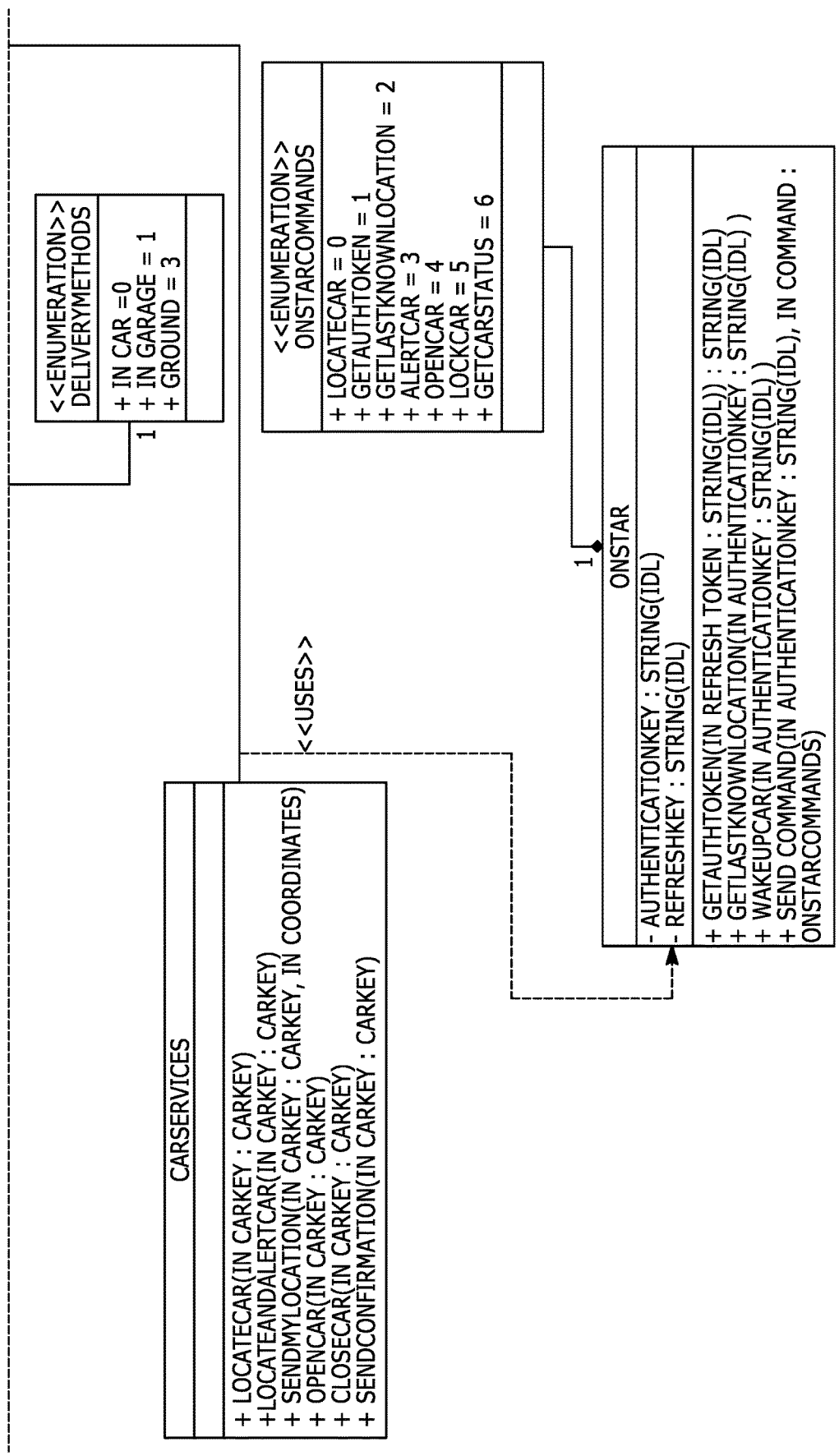

Next, the cloud based system for a package-exchange-service may be configured to have Wi-Fi or cellular communications to the dongle module in order to exchange information including GPS coordinates of the vehicle and to cause electromechanical actions within that vehicle including: unlocking doors, opening windows, opening trunks, closing trunks, opening and closing a sunroof or moon roof. The cloud based system for a package-exchange-service is hosted on a cloud-based provider site that contains one or more servers and one or more databases. The cloud based system for a package-exchange-service is coded to utilize a protocol, including HTTP, to engage in a request and response cycle with either i) a mobile device application resident on a client device of the user, ii) a web-browser application resident on the client device of the user/customer, or iii) both. The cloud based system for a package-exchange-service has one or more routines to automate the package delivery. (See FIG. 5 for an example class diagram of an embodiment of an application programming interface for the alternative package delivery method.) A hardware module, such as a dongle module, in the vehicle then causes electromechanical actions within that given vehicle in order to allow the cloud based system for a package-exchange-service to access a plurality of different kinds of vehicles, manufactured from a number of different manufactures. An example dongle module may cooperate with or be part of a navigation system in the vehicle. The cloud based system for a package-exchange-service has a security module scripted to establish a communication link with a package delivery vehicle via a communication network and to exchange information with a delivery application on a client device in order to send or receive information from a package delivery person. The cloud based system for a package-exchange-service has an additional security module for communicating to a user of the target vehicle having a package delivered to that vehicle, which is scripted to exchange information with a mobile application or desktop application on a client device of the user/customer. The vehicles include but are not limited to automobiles, trucks, vans, motorcycles, and other similar transportation mechanisms.

In the examples below, an OEM telematics provider is discussed but similar implementations may occur with the OEM telematics provider functionality being implemented directly by the cloud based package exchange system. Thus, the GPS coordinates of the vehicle are obtained from the dongle module or via a smart phone of the user. The cloud based package exchange system will cause electro-mechanical actuations via a remote keyless entry module, such as the BCM. A set of application programming interfaces may be set up between the cloud base package exchange service and cooperating partner services. A first module can be configured to provide one or more application programming interfaces between servers of two or more local package delivery services and servers of one or more merchant site systems to facilitate the steps below.

Figure 13:
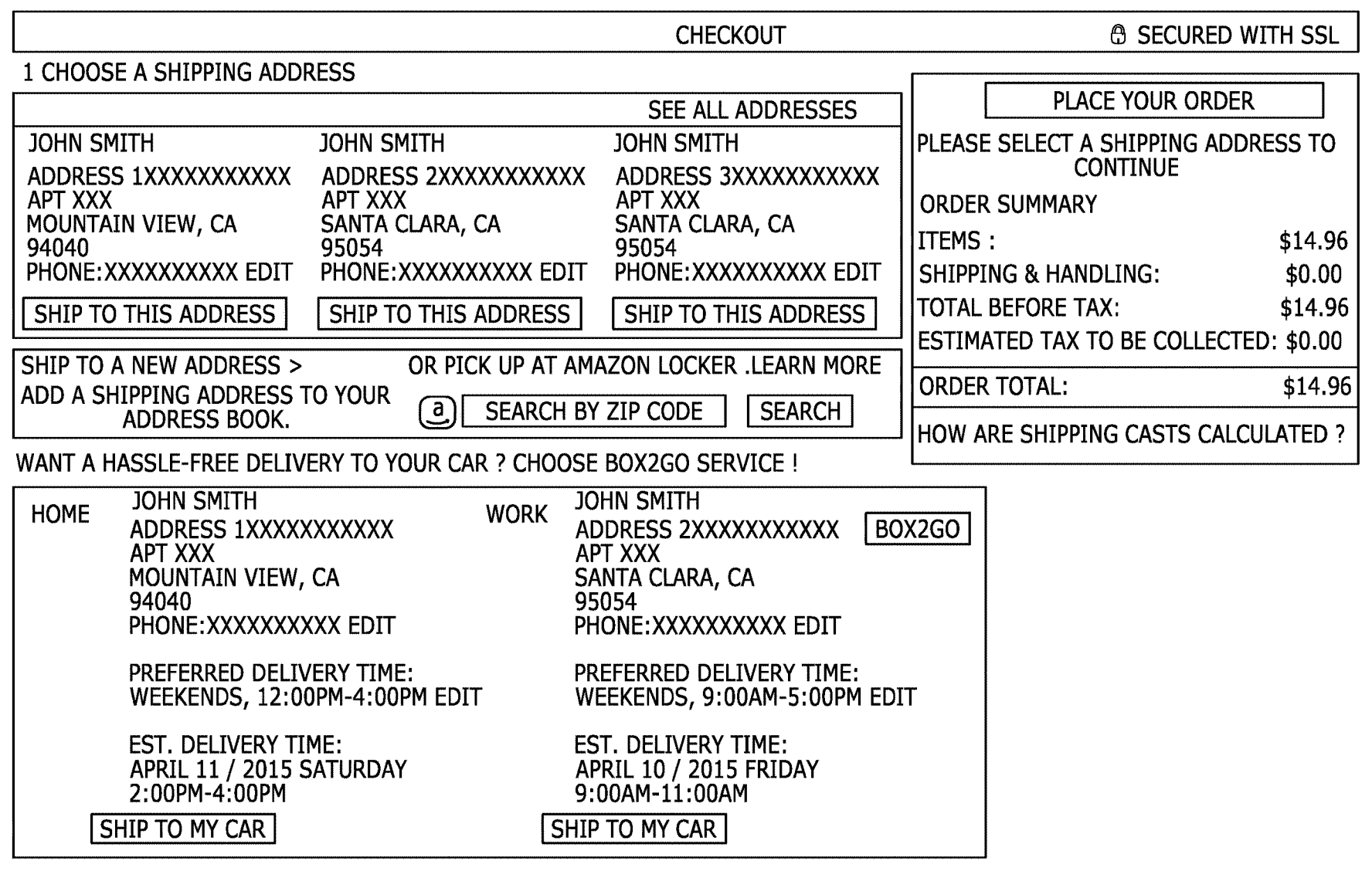

(1) The User 312 uses either a mobile application 254 on their client device (e.g., a mobile phone) or accesses a retailer's website via a browser on a desktop application 350 on their client device. The user while shopping at a retail store, at checkout, the customer will i) purchase one or more selected products on a retail website. The user interface at checkout offers an alternative package delivery option to have the purchased products delivered to a vehicle using a cloud-based package-exchange-service. The retailer's website collects order information including the products selected. The client device submits order and shipping information via the mobile application to the retailer's website, and in the case of delivering to a vehicle, the order includes the vehicle VIN. The user interface of the retailer's website offers the alternative delivery destination of the consumer's/user's vehicle 252 as a delivery destination (see, for example, FIG. 13). The user selects the delivery method offered on the user interface conveying a package delivery to a vehicle option in order to have the package delivered to the consumer's vehicle. The user interface offers the option of choosing a local package delivery service. The user interface offers a list of local delivery services to the customer to select a first delivery service. Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website 258 sends shipping information to the cloud based package-exchange-service 340. A server at the cloud-based package-exchange-service processes the alternative package pickup and delivery option by a server of the cloud-based package-exchange-service. The shipping data can include the customer/user data. Additionally, the user can be redirected to the website associated with the cloud based package-exchange-service to selected one of the options for package delivery. At the website associated with cloud based package-exchange-service, the customer/user is given a choice of selecting the package delivery option from among a list of local delivery services stored in a database associated with the cloud based package-exchange-service, or do not choose the local delivery services and select a package delivery system such as FedEx. The user/customer can choose the package delivery option based on delivery parameters such as price, flexibility (e.g., delivery time), and reliability. As an example, the user/customer can be given the option to search in the delivery parameters. In an example, the user/customer can search for cheapest delivery service. In an example, the user/customer can bid for the cost of delivery service.

In an example, a delivery module in the first server associated with a second database of the cloud-based system includes a first list of local delivery services. The first list of local delivery services includes registered individuals to be assigned to package exchange operations. The first list of local delivery services also includes package delivery restrictions and conditions including package size, hours of operation, distance to operate, and delivery prices. The customer uses a user interface configured to search and select a local delivery service from the first list.

(3) Alternatively, using a mobile application or a desktop application, the users can login to their account in the cloud based package-exchange-service and then get redirected to one or more retail websites such that after completing a purchase at each retail website, the users are directed back to their accounts at the cloud based package-exchange-service to select a delivery option. One for more retail stores/websites can established network connections with the website of the cloud base package-exchange-service such that the retail websites:

1) Display a logo (e.g., "Box2Go") of the cloud based package-exchange-service on their mobile application 254 or desktop application 350, where by clicking the logo the users can select the alternative delivery to their vehicles and/or select a delivery option.
2) A client of the cloud based package-exchange-service, after login, can get redirected to the retail websites for making purchases.

If a package delivery system, such as FedEx, is selected, the package delivery system can send a notification to the cloud based system for a package-exchange-service 340, including Tracking Number and VIN via the standardized open application programming interfaces. The notification including the shipping Tracking Number and VIN are stored in the databases 275 of the cloud based system for package-exchange-service 340.

The local delivery services may bid to deliver the package, or a group of packages. A module in the package exchange service site is configured to receive bids from the two or more local package delivery services to deliver one or more packages from the one or more merchant distribution sites in order to deliver the one or more packages to a vehicle.

Figure 12A:
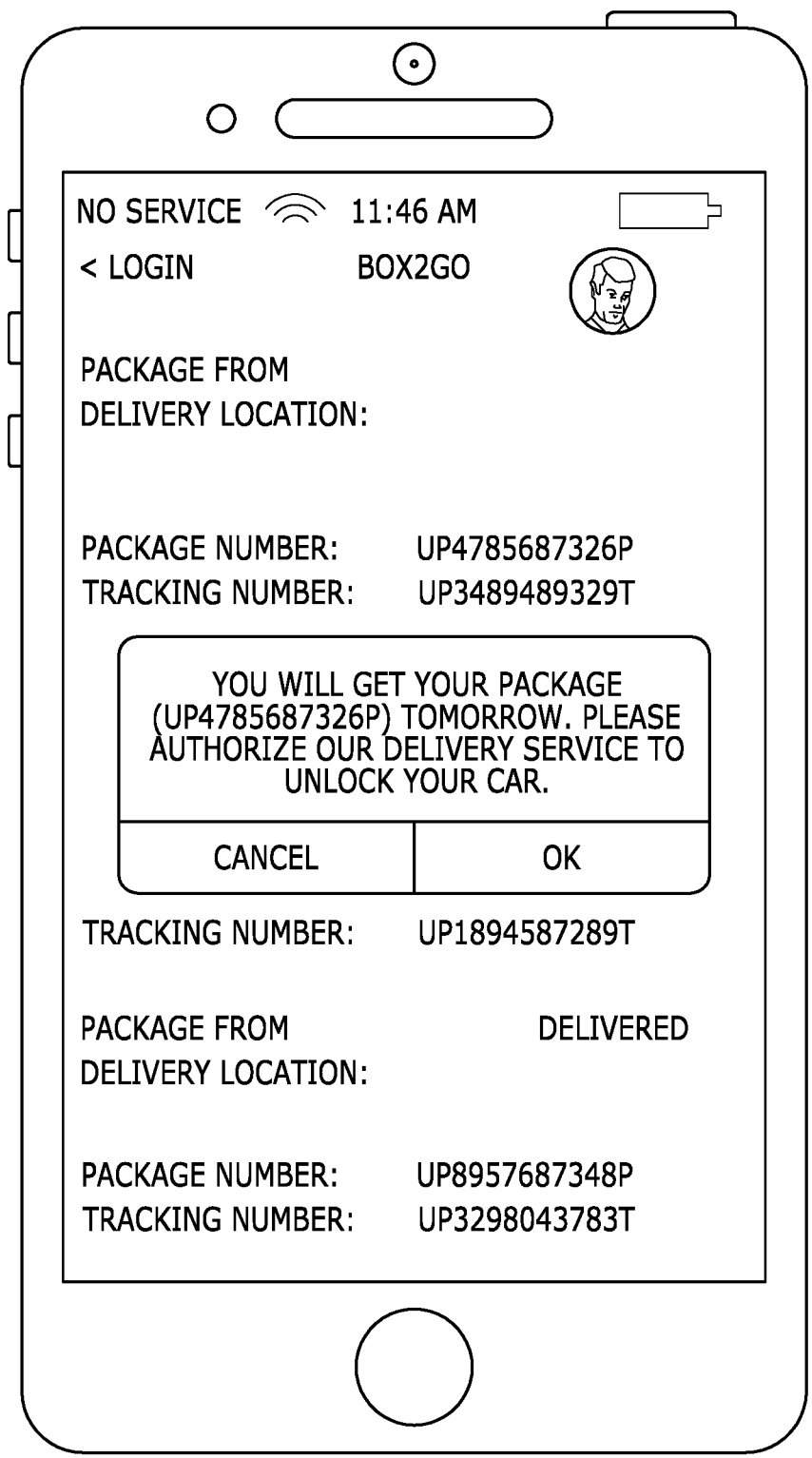
FIG. 12 illustrates the notices received on a client device of the user/customer.
Figure 12B:

(5) The cloud based system for package-exchange-service 340 sends a notification to either the mobile application 254 or the desktop application 350 on their client device and confirms with the User their desire to have a package shipped to their vehicle with the Tracking Number and/or VIN of the target vehicle (see, for example, FIG. 12). The confirmation notice also acts as a security mechanism to ensure that the user did in fact elect to have a package delivered to their vehicle 252.

(6) After the first notification, the User can supply a response into either the mobile application or the desktop application on their client device to send permission to the cloud based system for a package-exchange-service. In response to the second notification, the user may supply a second confirmation including a virtual key or a security token of the vehicle. The cloud based system for a package-exchange-service has a multiple phase, such as a two-phase, verification mechanism involving two security keys. The cloud-based infrastructure is scripted to validate authorization for the package delivery to a registered owner's vehicle. The source of initiating the request to open up the car is verified twice as the first virtual key coming along with a request from a package delivery vehicle is verified. Also, a second car actuation security token such as a second virtual key is coming from the client device associated with the user. The second virtual key can be a rolling security key of a Body Control Module (BCM) of the target vehicle of the customer.

The first virtual key is provided by the cloud based system 340 associated with the package-exchange-service using a secure communication to a client device in the package delivery vehicle or to a client device of the package delivery person. The first virtual key can be used by the cloud-based system of package-exchange-service 340 to authenticate commands/request/data received from package delivery vehicle and package delivery person when the received command/request/includes the first virtual key. In an example, the first virtual key is a public key generated by the cloud based system 340 such that only the cloud based system 340 knows an associated private key matching the public key and can authenticate the received command/request/data including the first virtual key. As described with respect to FIGS. 3A-3C, the GPS coordinates of the package delivery vehicles as well as the commands can be received from the package delivery person 304/package delivery vehicle 322.

In an embodiment, the cloud based system for a package-exchange-service includes a pool of virtual keys that includes one or more public keys and their associated private keys. The pool of virtual keys is in at least one database of the cloud-based server. The first virtual key can be a public key from the pool of virtual keys and can be supplied by the security module of the cloud system 340, via a secure communication, to a client device of the package delivery vehicle 322. Also, the client device of the package delivery vehicle can use the first virtual key with each communication to the security module. The security module of the cloud-based system of package-exchange-service can use the first virtual key included in the communications from the client device of the package delivery vehicle to authenticate the received communications. Authentication can include matching a public key with an associated private key of the pool of virtual keys. In an example, a distinct first virtual key is used for each package transfer and the virtual key is recycled or discarded after the package transfer. In another example and to tighten the security, the first virtual key can be made unique in space and time such that it is only valid in a specific window of time and in a specific location of space. For example, the first virtual key can be active only between noon and 4 pm on a specific day and if the package delivery vehicle is located is specific location of a city.

(7) After the package arrives in the same city, the package delivery person 304 uses the package delivery application 315 in their client device to send the Tracking Number to the package-exchange-service in order to obtain the vehicle's information including its current location information. FIG. 3A shows a package delivery application 315 on the client device of the delivery person 304.

Upon approaching the target vehicle, an application in the client device of the package delivery person can send a request to the cloud based system for a package-exchange-service to wake up, for example, the dongle module of the target vehicle by either automatically detecting a close proximity by the first threshold distance between the package delivery vehicle and the target vehicle or can be prompted by the package delivery person to send the request. Alternatively, the distance between the package delivery vehicle and the target vehicle can independently be monitored by the cloud-based system for a package-exchange-service and the request can be sent without package delivery person's involvement. The dongle module may be in a sleep-mode as this prevents battery drain when vehicle is not in use and thus the dongle module needs to be sent a wake up notice. The cloud based system for a package-exchange-service via the one or more application programming interfaces sends one or more wake up requests to the dongle module to wake up the vehicle. Alternatively, a GPS based proximity module in the cloud-based system for a package-exchange-service can calculate the distance between the delivery vehicle and the target vehicle and send the wake up message. In an embodiment, the wake up message can be initiated either manually by the package delivery person, or automatically by a GPS based proximity module in the cloud-based system for a package-exchange-service. In an example, the dongle module may not drain battery power or may drain very little battery power thus may not go to sleep. In such case, the waking up step can be omitted. The wake up message can be sent from the security module associated with the cloud-based package-exchange-service to the dongle module in the target vehicle through a cellular communication.

As discussed, a GPS-based proximity module in a first server associated with package-exchange-service is configured to receive both current GPS coordinates of a package delivery vehicle and current GPS coordinates of the target vehicle of a customer. The GPS coordinates are used for at least one package exchange operation to the target vehicle of the customer. The GPS coordinates are stored in a first database of the cloud based provider site. The GPS-based proximity module is configured to monitor a distance between the package delivery vehicle and the target vehicle of the customer.

Thus, the current GPS coordinates of a package delivery vehicle is transmitted from a GPS-based delivery application 315 resident in a client device associated with a package delivery vehicle. The client device resides 1) in the package delivery vehicle 322, or 2) in a handheld tool that travels with a delivery person 304 of the package delivery vehicle. The GPS-based delivery application 315 can transmit the current GPS coordinates of the package delivery vehicle/person along with the first virtual key for authentication. The GPS-based delivery application 315 is downloadable from a website or, otherwise electronically distributed to the client device from a database in the cloud based server.

(8) After step (6), the cloud based system for a package-exchange-service has tracked the vehicle's location and sends the location information out upon a request from the package delivery person. As described, the GSP coordinates of the target vehicle can be obtained via a cellular communication from the dongle module in the target vehicle and sent to the security module associated with the could-based package-exchange-service. When the on-board actuation module of the target vehicle is an on-board RF module, the GPS coordinates of the target vehicle can be sent by a client device of the user/customer to the security module associated with the could-based package-exchange-service, at the time the user/customer turns off the engine or locks the target vehicle.

Additionally, the distance between the GPS coordinates of the package delivery vehicle having a delivery application resident in a client device in the delivery vehicle and the target vehicle's GPS coordinates is monitored and compared by a GPS based proximity module in the cloud-based system for a package-exchange-service.

(9) After the package delivery entity system's delivery person approaches the vehicle, a request is sent to the cloud based system for a package-exchange-service to blink the hazard lights and open the trunk. In return, the cloud based system for a package-exchange-service can send a command and a rolling security key of the BCM of the target vehicle via the client device of the delivery person to be used by a key fob simulator in the target vehicle to cause the blinking of the hazard lights and or cause to open the trunk. The command can be sent from the security module associated with the cloud based system of package-exchange-service, via direct cellular communication, to the dongle module of the target vehicle, or alternatively, via cellular communication to a client device of the package delivery vehicle/person and then from the client device via wireless communication to the dongle module of the target vehicle.

Figure 7A:
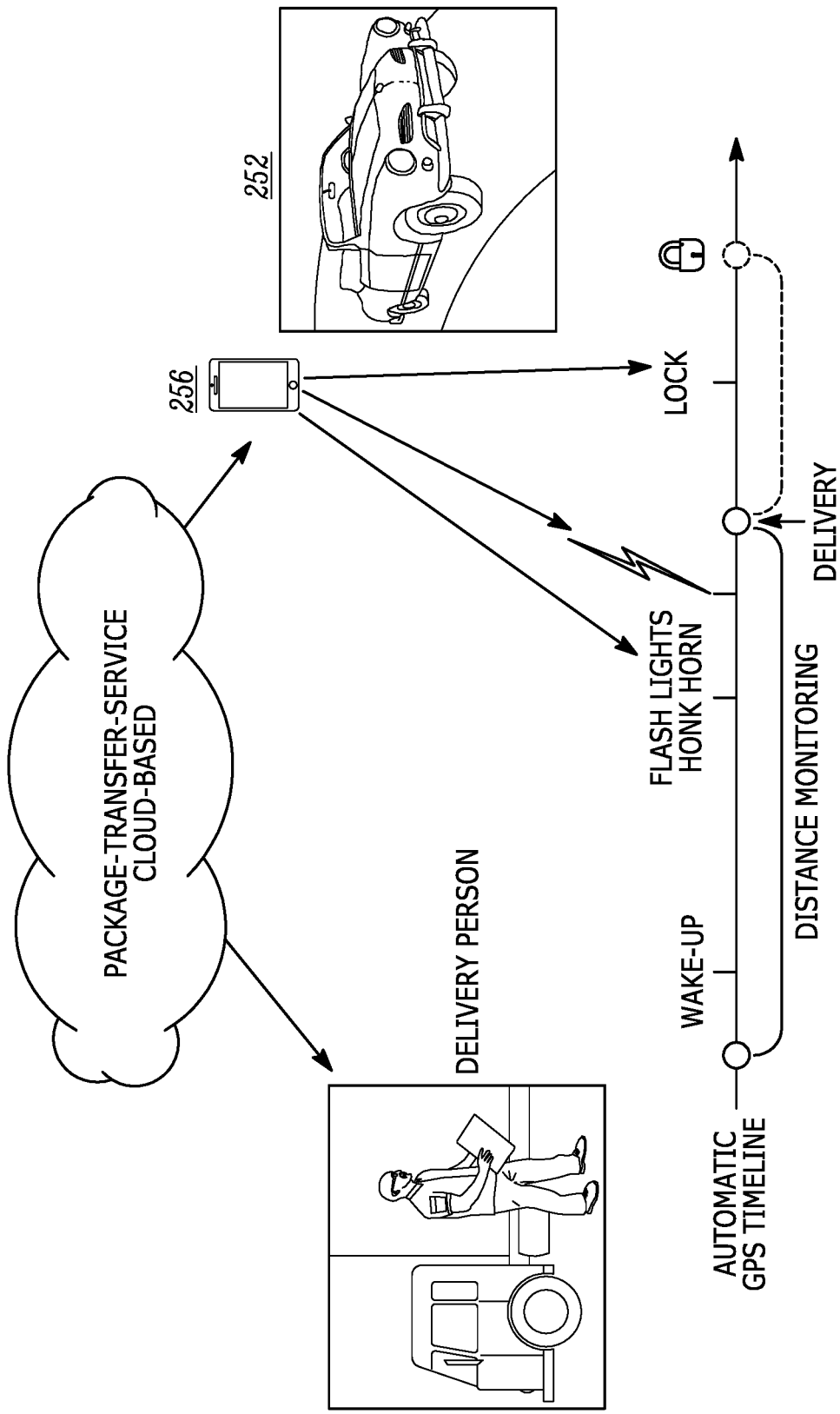
FIGS. 7A and 7B illustrate block and flow diagrams of embodiments of the GPS-based control and tracking mechanisms used for delivery to or pick-up from the vehicle.

As discussed, a GPS-based proximity module or a security module in the cloud based system for a package-exchange-service will also send a request via the one or more application programming interfaces to the dongle module to cause a localized alert in the target vehicle so that the vehicle can blink the vehicle's lights and honk its horn to alert the package delivery person directly to the target vehicle's location (see, for example, FIG. 7A), in order to save time and aid in locating the target vehicle within rows of parked cars. Alternatively, the client device of the package delivery vehicle or the client device of the package delivery person can initiate the request. This ensures the designated target vehicle is identified properly and increases efficiency of delivering the package.

(10) The cloud based system for a package-exchange-service verifies the request and blinks the hazard lights and/or unlocks the target vehicle including the trunk. In an example, the commands can be sent from the security module in the cloud-based system for a package-exchange-service via a client device of the delivery person to the dongle module.

As discussed, before sending the functional commands including lock/unlock doors and give an alert to the target vehicle of the customer, the GPS-based proximity module or a security module in the cloud based system for a package-exchange-service receives at least two virtual verification keys, a first virtual verification key from the client device associated with the package delivery vehicle and a second virtual verification key from the client device associated with the customer. The first virtual verification key can be given a first shelf life and the second virtual verification key can be given a second shelf life such that sending of the functional commands stay within an overlap window of time between the first shelf life and the second shelf life.

Thus, the security module is configured to receive a first virtual key via a first port and one of 1) a request for the package-exchange-service, 2) data, or 3) both, from a first client device associated with the package delivery vehicle. The first virtual key has a first shelf life and is stored in a first database of the cloud-based system. The first virtual key is used by the security module for a first authentication of communications from the first client device.

Also, the security module is configured to receive a security token associated with both a customer and the target vehicle from a second client device associated with the customer. The security token has a second shelf life. The security token is used for a verification of the customer and the target vehicle of the customer.

Additionally, the security module is configured to send the security token for verification as well as one or more functional commands regarding the target vehicle to be execute on the target vehicle. The security module can send the security token and commands to any of the first client device, ii) one or more application programming interfaces of a server of a third party site or iii) internally to another module within the cloud based system for a package-transfer-service. After the first authentication and in an overlap window of time between the first shelf life and the second shelf life, the security module is configured to send the commands to the target vehicle: 1) based on the request from the first client device associated with the package delivery vehicle, or 2) initiated by the security module. The security module is configured to send the functional commands regarding the target vehicle over a network to either a local client device or over the network via the one or more application programming interfaces of the server of third party site to an on-board actuation module installed in the target vehicle. In response to the commands, the on-board actuation module is configured to cause an electro-mechanical operation in the target vehicle to any of i) open up a door, a window, or a trunk of the target vehicle, ii) unlock the door or the trunk of the target vehicle, and iii) any combination of these two such that the package delivery service can perform the at least one package exchange operation with the target vehicle.

Optionally, the GPS based proximity module waits for a confirmation from the delivery application that the package delivery person has located the target vehicle. Then the GPS based proximity module composes a correct request command and sends the request via the one or more application programming interfaces to the dongle module in the vehicle to open the trunk of the vehicle or some other electro-mechanical actuation of a window or sunroof of the vehicle.

The command can be sent from the security module associated with the cloud based system of package-exchange-service, via direct cellular communication, to the dongle module of the target vehicle, or alternatively, via cellular communication to a client device of the package delivery vehicle/person and then from the client device via wireless communication to the dongle module of the target vehicle.

(11) After placing the package in the target vehicle, e.g., a trunk of the target vehicle, and closing the doors including the trunk, the package delivery entity system's delivery person sends a delivery completion confirmation to the cloud based system for a package-exchange-service (see, for example, FIG. 12). Alternatively, the package delivery person, instead of placing a package, may retrieve a package from the target vehicle.

(13) After (11), the cloud based system for a package-exchange-service polls the status of the vehicle. In fact, after receiving a confirmation of the completion of package transfer from the package delivery application of the package delivery person's client device, the GPS-based proximity module in the cloud based system for a package-exchange-service can receive GPS coordinates from the package delivery application in the package delivery person's client device and resume monitoring the package delivery vehicle. The GPS based proximity module performs distance monitoring to recognize when the package delivery person is departing and then is scripted to verify that the target vehicle is locked and to avoid the package delivery person leaving an unlocked vehicle. The cloud based system for a package-exchange-service polls the lock status of the target vehicle by sending a request to the dongle module.

(14) Dongle responds with the lock door status (open/closed). If door lock status is not confirmed locked, the GPS-based proximity module in the cloud based system for a package-exchange-service sends a request via the one or more application programming interfaces to the dongle module in the vehicle to close and lock the vehicle's doors/trunk. This feature improves security to insure the vehicle is locked after departure and is not left unlocked.

Note, the onboard dongle module in the target vehicle of the customer can be configured to communicate with the GPS-based proximity module and/or the security module of the cloud based system for a package-exchange-service through the Wi-Fi or cellular communications to receive the functional (electro-mechanical) commands including lock/unlock doors and give an alert. The dongle module can have a key fob simulator such that it can include an RF circuitry of a key fob and can be configured to perform the functional (electro-mechanical) commands by transmitting RF signals that include the functional commands to a Body Control Module (BCM) of the target vehicle of the customer.

The GPS proximity module is scripted to perform multiple actions via the dongle module including i) waking up a vehicle, ii) facilitating for the electro mechanical operations in the vehicle to occur, such as unlocking/locking doors, opening/closing windows, opening and unlocking/closing and locking a trunk, opening/closing sunroof, and iii) detecting when the package delivery vehicle is at a certain distance away from the target vehicle, then the vehicle should become secure at that point. In an example, the commands can be sent via a client device of the delivery person to the dongle module.

(15) The cloud based system for a package-exchange-service sends a delivery confirmation notice to the User. Additionally, the cloud based system for a package-exchange-service can provide the user/customer with an option of rating the package delivery service such that through a user interface of the cloud based system for a package-exchange-service the customers can enter their ratings. The customer ratings can be processed and saved in a database of the cloud based system for a package-exchange-service. Also, the customer ratings can be presented to a user when the user selects a package delivery service.

In an example, the dongle module can have a key fob simulator such that it has a circuitry including the RF circuitry of a key fob and additionally is capable of executing an algorithm to generate rolling security keys of the Body Control Module. The dongle module can be taught as an extra key fob. The teaching of the dongle module as an extra key fob can be automated and performed by receiving commands via Wi-Fi or cellular communications from the security module or the GPS-based proximity module of the cloud based system for a package-exchange-service. After being taught, the current rolling security key can be stored in the dongle module. Upon receiving the functional (electro-mechanical) commands the dongle module can generate the next rolling security key based on the current rolling security key to be transmitted along with the functional commands to the Body Control Module.

Alternatively, in an example (e.g., for security reasons), the current rolling security key may not be stored in the dongle module and can be transmitted to the cloud based system for a package-exchange-service and/or transmitted to a client device of the user and can be stored in the client device of the user and/or stored in a database associated with the cloud based system for a package-exchange-service such that the security module or the GPS-based proximity module of the cloud based system for a package-exchange-service sends the functional command and the stored rolling security key to the dongle module. Upon receiving the functional commands and the rolling security key, the dongle module generates the next rolling security key based on the received current rolling security key to be transmitted along with the functional commands to the Body Control Module. In an example, the next rolling security key can be generated by the security module of the cloud based system for a package-exchange-service such that the security module or the GPS-based proximity module of the cloud based system for a package-exchange-service sends the functional command and the next rolling security key to the dongle module to be transmitted along with the functional commands to the Body Control Module.

In an example, the dongle module can transmit (e.g., using Bluetooth) the current rolling security key of the Body Control Module to a client device of the user, which the user can transmit, via cellular communication, the current security key as the security token to the security module of the cloud based system for a package-exchange-service to be used for verification of the user and target vehicle.

As discussed, a security module in the first server associated with the package-exchange-service is configured to setup the at least one package exchange operation including 1) directing the package delivery vehicle to the target vehicle of the customer, 2) opening and/or unlocking the target vehicle of the customer to ensure the at least one package exchange operation can be performed with the target vehicle of the customer, 3) ensuring the at least one package exchange operation have been performed, and 4) after performing the at least one package exchange operation, ensuring the target vehicle of the customer is closed and locked and the at least one package exchange operation is complete.

In an embodiment, the security module in cooperation with the GPS-based proximity module is configured to send to the target vehicle of the customer one or more functional commands. The functional (electro-mechanical) commands include 1) to wake-up an on-board actuation module in the target vehicle of the customer while in a close proximity established by a first threshold distance between the package delivery vehicle and the target vehicle of the customer, 2) to give an alert from the target vehicle of the customer while in a close proximity established by a second threshold distance between the package delivery vehicle and the target vehicle of the customer, 3) to unlock a door of the target vehicle of the customer, and 4) to lock the doors of the target vehicle of the customer after receiving a confirmation of a completion of the at least one package exchange operation.

In an embodiment, the actuation module of the target vehicle is a dongle module. In an example, when a rolling security key of the Body Control Module is generated, the (current) rolling security key is transmitted to the cloud based system to be stored in a Box2Go account corresponding to the user and the target vehicle. The generated current rolling security key is also transmitted and saved in the client device of the user. When a user requests a delivery to the target vehicle, then the current rolling security key is sent by the client device of the user to the cloud based system, the rolling security key is matched with the rolling security keys in Box2Go accounts of the cloud based system for user and target vehicle verification. The commands sent by the cloud based system also includes the current rolling security key, which can be matched with by the dongle module with its rolling security key for authentication of the commands. The current rolling security key of the Body Control Module can be assigned a shelf life by the cloud-based system.

The onboard actuation module may be any of i) an onboard telematics module installed in the target vehicle of the customer and configured to communicate with a cloud based server associated with the package-exchange-service through a cloud based telematics provider, ii) a key fob access module installed in the target vehicle, or iii) a dongle module having a Wi-Fi or cellular communication circuit configured to establish a secure communication with the cloud based server associated with the package-exchange-service. The dongle can also be coupled to an electro-mechanical activation circuit configured to cooperate with a fault and diagnostic module installed in the target vehicle of the customer to retrieve diagnostic data including the GPS coordinates of the target vehicle of the customer.

An embodiment of a key fob access module may be a Body Control Module (BCM) installed in the target vehicle. A first rolling security key can be used by of a Body Control Module (BCM) of the target vehicle of the customer. The security module in the server associated with the package-exchange-service is configured to command the onboard actuation module in the target vehicle of the customer via using Wi-Fi or cellular communication to establish a secure communication with the onboard actuation module and to send commands including the lock and unlock commands using one or more rolling security keys of a Body Control Module of the target vehicle of the customer to the onboard actuation module. The onboard actuation module may include a Radio Frequency circuitry of a key fob entry system. After receiving the sequence of commands and the rolling security keys, the onboard actuation module communicates RF signals including the corresponding commands and rolling security keys to the Body Control Module of the target vehicle of the customer to perform mechanical operations including locking and unlocking of the target vehicle.

The security module in the server associated with the package-exchange-service may be configured to send commands including the lock and unlock commands and one or more rolling security keys of a Body Control Module of the target vehicle of the customer to a second client device associated with a package delivery vehicle. The hand held client device allows the delivery person to use the key fob simulator in the client device to transmit RF signals including commands and rolling security keys to the RF circuitry and/or Body Control Module of the target vehicle of the customer to perform mechanical operations including locking and unlocking of the target vehicle.

Additionally, when the on-board actuation module of the target vehicle is the on-board dongle module, the on-board dongle module is coupled to a fault and diagnostic module installed in the target vehicle of the customer. The dongle module can retrieve diagnostic data including the current GPS coordinates of the target vehicle of the customer from the fault and diagnostic module. The on-board dongle module is configured to send the current GPS coordinates of the target vehicle of the customer via a Wi-Fi or cellular communication and through a local client device to the GPS-based proximity module.

Also, when the on-board actuation module of the target vehicle is an on-board RF module, the current GPS coordinates of the target vehicle is calculated by the second client device of the customer at an instance the target vehicle is locked, where the current GPS coordinates are uploaded from the second client device of the customer through the cellular communication to the GPS-based proximity module.

In an embodiment, a cloud-based package-exchange-service is hosted on a cloud based provider site that includes one or more servers. Each server having one or more processors. The servers are configured to communicate with one or more databases in the cloud based provider site.

Additionally, the target vehicle of the customer can include a RFID reader. Also each package can include a separate RFID tag. The RFID reader can communicate with the actuation module of the target vehicle and can be activated by the actuation module of the target vehicle to read RFID tags inside the target vehicle. Through the actuation module and by reading the RFID tags, is can be confirmed that the one or more package exchanges have been performed.

High-Level Description of Each Transaction in Case of Telematics Solution

In an embodiment, the actuation module of the target vehicle is a telematics module. The GPS-based proximity module of the cloud-based system 340 obtains at least two virtual verification keys, one from an OEM telematics provider 310 and another from a package delivery vehicle before sending a command to the target vehicle 252. The virtual verification keys are given a shelf life such that sending of the command to unlock the door including the trunk of the target vehicle, the target vehicle stays within a predetermined time frame.

Figure 4:
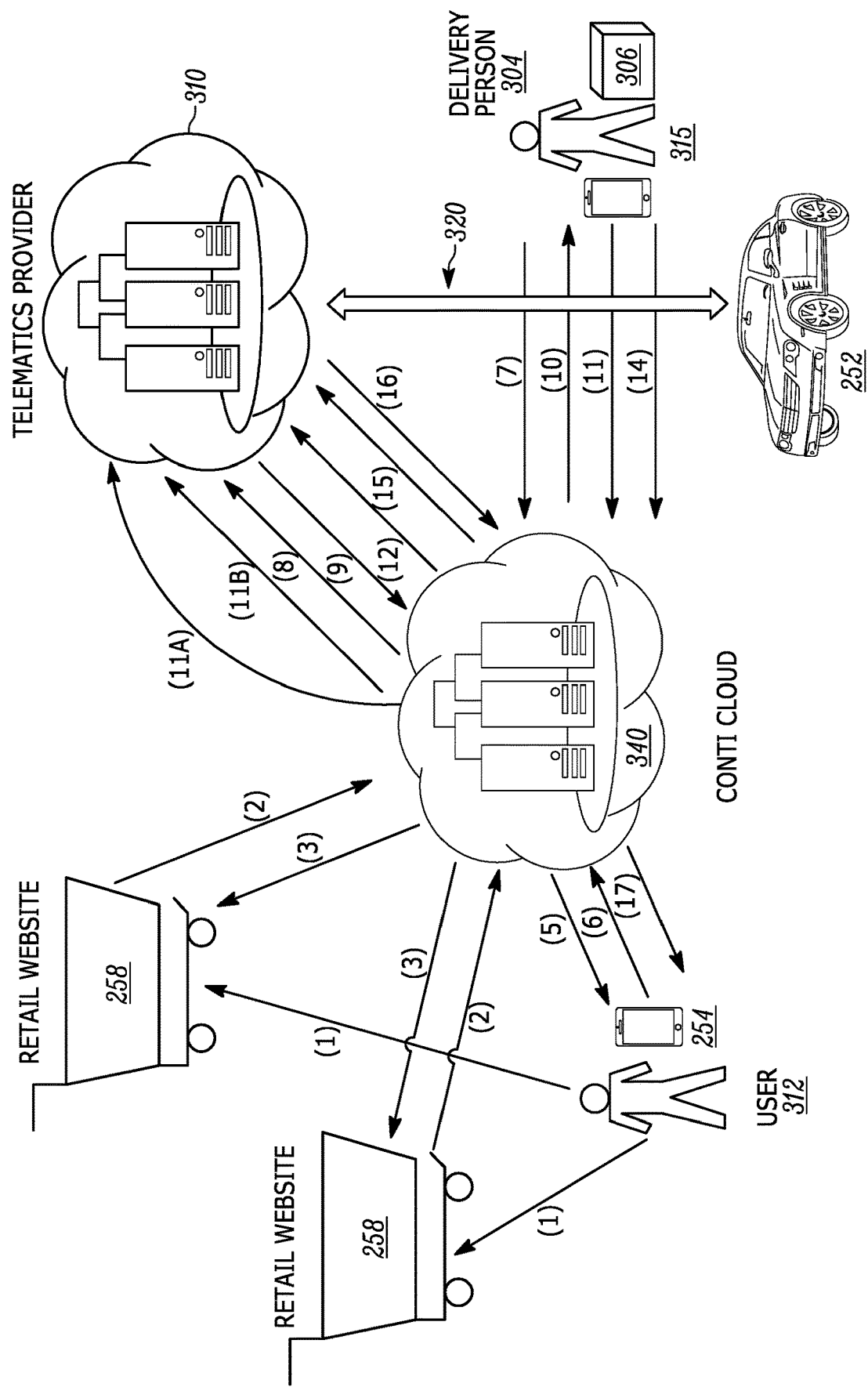
FIG. 4 illustrates a block and flow diagrams of an embodiment of the alternative package delivery system using a telematics solution.

FIG. 4 illustrates block and flow diagrams of embodiments of the alternative delivery system using a telematics solution. FIG. 4 shows retail websites 258, a geo-proximity Vehicle Alert and Access System (cloud based system for a package-exchange-service) 340, and a Telematics provider 310. However, similar principles can be applied in any of the solutions discussed herein such as merely using merchant sites and package delivery services without integrating the telematics solution into the design.

The alternative package pickup and delivery system is discussed. The system includes a cloud-based package-exchange-service that is hosted on a cloud-based provider site, a database of local delivery services having one or more delivery vehicles with client devices having a first delivery application resident in each client device, and one or more OEM 'remote access/connectivity' systems 310, such as OnStar™, that are configured to have communications between the cloud and a vehicle in order to exchange information including GPS coordinates of the vehicle and interact with the vehicle's on-board intelligence system, such as an on-board telematics module, to cause electromechanical actions within that vehicle including: unlocking doors, opening windows, opening trunks, closing trunks, opening and closing a sunroof or moon roof. Thus, the on-board intelligence system may cause the opening & closing of those mechanical portions of the car/vehicle. The cloud-based package-exchange-service is hosted on a cloud-based provider site that contains one or more servers and one or more databases, including the cloud based server, that cooperate with one or more databases to store the data and reference information needed to control and track the package exchange process, to speed up the package delivery and pick-up process, and to ensure security for the package exchange process. The cloud-based package-exchange-service is coded to utilize a protocol, including HTTP, to engage in a request and response cycle with either i) a mobile device application resident in a client device, ii) a web-browser application resident in the client device, or iii) both. The cloud-based package-exchange-service has one or more routines to automate the package to and from vehicle delivery. The cloud-based package-exchange-service has one or more open application programming interfaces to standardly exchange information between the servers of two or more OEM 'remote access/connectivity' systems such as an OEM telematics system. (See FIG. 5 for an example class diagram 500 of an embodiment of an application-programming interface for the alternative package pickup and delivery system.) The telematics systems are configured to have wireless communications between a server in the cloud and a given vehicle. A hardware module, such as a telematics module, in the vehicle then causes electromechanical actions within that given vehicle in order to allow the cloud-based package-exchange-service to access a plurality of different kinds of vehicles, manufactured from a number of different manufactures. An example telematics module may cooperate with or be part of a navigation system in the vehicle. The cloud-based package-exchange-service has a security module scripted to establish a communication link with a communication terminal of either or both of the telematics systems or the package delivery sites via a communication network. The cloud-based package-exchange-service has an additional security module scripted to exchange information with a delivery application on a client device in order to send or receive information from a delivery person. The cloud-based package-exchange-service has an additional security module for a user of the target vehicle having a package picked up or delivered to that vehicle, which is scripted to exchange information with a mobile application or desktop application on a client device. The package may be a retail shop item, flowers, perishables, tobacco and alcohol, postal letters, food or other consumable items, and other similar deliverable items. The vehicles include but are not limited to automobiles, trucks, vans, motorcycles, and other similar transportation mechanisms. The OEM 'remote access/connectivity' systems can include manufactures, such as Tesla Motors, who have backend servers that directly communicate with a telematics module in the vehicle.

An onboard actuation module in the target vehicle may be one of i) a telematics module installed in the target vehicle or ii) a dongle module having a Wi-Fi or cellular communication circuit configured to establish a secure communication with the cloud based server and an electro-mechanical activation circuit configured to cooperate with a fault and diagnostic module installed in the target vehicle. The described features can work when the actuation module is a telematics module, a dongle module, or when there is only an on-board RF module in the target vehicle.

FIG. 4 illustrates an example sequence of numbered steps. The numbered steps (1) through (17) are described below.

(1) The User (customer) 312 uses either a mobile application 254 on their client device (e.g., a mobile phone) or accesses a retailer's website via a browser on a desktop application 350 on their client device. The retailer's website 258 collects order information including the products selected. The client device submits order and shipping information via the mobile application to the retailer's website, in the case of delivering to a vehicle, the shipping information includes the vehicle VIN. The user interface of the retailer's website offers the alternative delivery destination of the consumer's/user's vehicle 252 as a delivery destination (see, for example, FIG. 13). Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website 258 sends shipping information to the package-exchange-service 340. The shipping data can include the customer/user data. At the website associated with cloud based package-exchange-service, the customer/user is given a choice of selecting the package delivery option from among a list of local delivery services stored in a database associated with the cloud based package-exchange-service, or do not choose the local delivery services and select a package delivery system such as FedEx. The user/customer can choose the package delivery option based on delivery parameters such as price, flexibility (e.g., delivery time), and reliability. As an example, the user/customer can be given the option to search in the delivery parameters. In an example, the user/customer can search for cheapest delivery service, earliest delivery service, or most reliable delivery service. In an example, the user/customer can bid for the cost of delivery service.

(3) Alternatively, using a mobile application or a desktop application, the users can login to their account in the cloud based package-exchange-service and then get redirected to one or more retail websites such that after completing the purchase at each retail website, the users get back to their accounts at the cloud based package-exchange-service to select a delivery option. One for more retail stores/websites can established network connections with the website of the cloud base package-exchange-service such that the retail websites a) Display a logo (e.g., "Box2Go") of the cloud based package-exchange-service on their mobile application 254 or desktop application 350, where by clicking the logo the users can select the alternative delivery to their vehicles and/or select a delivery option.

b) A client of the cloud based package-exchange-service, after login, can get redirected to the retail websites for making purchases.

If a package delivery system such as FedEx is selected, the package delivery system can send a notification to the cloud based system for a package-exchange-service 340, including Tracking Number and VIN via the standardized open application programming interfaces. The notification including the shipping Tracking Number and VIN are stored in the databases 275 of the cloud based system for package-exchange-service 340.

(5) The cloud based system for a package-exchange-service 340 sends a notification to either the mobile application 254 or the desktop application 350 on their client device and confirms with the User their desire to have a package shipped to their vehicle with the Tracking Number and VIN for the package delivery. The confirmation notice also acts as a security mechanism to ensure that the user did in fact elect to have a package delivered to their vehicle 252.

(6) The User supplies a response into either the mobile application 254 or the desktop application 350 on their client device to send permission (User name and Password) for the telematics system (module), such as OnStar, to the cloud based system for a package-exchange-service 340. The User name and Password for the telematics module of the target vehicle can be sent encrypted such that the cloud based system for a package-exchange-service 340 may not discover it. The cloud based system for a package-exchange-service 340 has a multiple step, such as a two-phase, verification mechanism. The cloud-based infrastructure is scripted to validate authorization for the package delivery service to a registered owner's vehicle. The source of initiating the request to open up the car is verified twice as a delivery order key coming from a package delivery vehicle is verified as well as the car actuation virtual key coming from the telematics system 310. The cloud based system for a package-exchange-service 340 can tentatively propose a data and time frame for the alternative package delivery to the customer (See FIGS. 9A-9D for embodiments of the multiple paired virtual keys and security authorization notices used by the package-exchange-service.)

(7) After the package arrives at the same city, the package delivery person 304 uses the package delivery application 315 in their client device to send the Tracking Number to the cloud based system of package-exchange-service in order to obtain the vehicle's information including its current location information.

When the on-board actuation module of the target vehicle is the on-board telematics module, the on-board telematics module is configured to send the current GPS coordinates of the target vehicle to the server of the telematics provider. The server of the telematics provider is configured to send the GPS coordinates of the target vehicle to the cloud based system having the GPS-based proximity module. The data is transmitted, via a secure communication, from the telematics provider to the GPS-based proximity module associated with the cloud-based package-exchange-service.

(8) The package-exchange-service in the cloud 340 sends a request via the one or more open application programming interfaces to the OEM backend of the telematics entity system 310 for the vehicle's current GPS location information using VIN of the target vehicle.

(9) The telematics system OEM backend site 310 communicates with the vehicle's navigation system and sends back the vehicle location information from the vehicle's navigation system via the one or more open application programming interfaces to the cloud based system for a package-exchange-service 340. The cloud based system for a package-exchange-service 340 stores this information in its database.

(10) The cloud based system for a package-exchange-service 340 responds to the package delivery application 315 in the client device of the delivery person 304 with the target vehicle's location information. In an embodiment, the GPS coordinates of the target vehicle 252 may not be sent to the package delivery application 315 in the client device of the delivery person 304 and the cloud based system for a package-exchange-service 340 may solely track the distance between the delivery vehicle (truck) 322 and the target vehicle (car) 252.

(11) Upon approaching vehicle 252, the package delivery application 315 in the client device of the delivery person 304 can send a request to the cloud based system for a package-exchange-service 340 to wake up the vehicle 252 by either automatically detecting a close proximity by the first threshold distance between the package delivery vehicle 322 and the target vehicle 252 or can be prompted by the delivery person to send the request. Alternatively, the distance between the package delivery vehicle 322 and the target vehicle 252 can independently be monitored by the cloud based system for a package-exchange-service 340 and the request can be sent without delivery application 315 or delivery person 304 involvement. The vehicle's telematics module 310 may be in a sleep-mode as this prevents battery drain when vehicle is not in use and thus the vehicle's telematics module needs to be sent a wake up notice. The cloud based system for a package-exchange-service 340 via the one or more application programming interfaces sends one or more wake up requests to the telematics system OEM Backend 310 in order for the telematics system OEM Backend 310 to wake up the vehicle 252. Alternatively, the GPS-based proximity control routine in the GPS-proximity module of the cloud based system for a package-exchange-service 340 can calculate the distance between the delivery vehicle 322 and the target vehicle 252 and send the wake up message. In an embodiment, the wake up message can be initiated either manually by the delivery person 304, or automatically by the GPS-based proximity control routine in the cloud-based system for a package-exchange-service 340.

Additionally, the distance between the GPS coordinates of the delivery vehicle 322 having the delivery application 315 resident in a client device in the delivery vehicle and the target 252 vehicle's GPS coordinates as periodically fed back by the telematics system OEM Backend 310 and the delivery application 315 is monitored and compared by a GPS-based proximity control routine in the cloud based system for a package-exchange-service 340.

(11A) The GPS-based proximity control routine in the cloud based system for a package-exchange-service 340 via the one or more application programming interfaces sends one or more wake up requests to the telematics system OEM Backend 310 to wake up the target vehicle as the package delivery vehicle arrives near the target vehicle 252. However, without the advanced sequence of wake up requests, the vehicle telematics control may be in sleep mode and a delivery driver might be forced to wait 10 minutes or more to unlock the door. This wake up control ensures that an Unlock Vehicle command will execute immediately when the package delivery truck 322 arrives since the vehicle is awake. In order to prevent a delay due to in-vehicle power saving mode, the vehicle's telematics module is sent a command (e.g., send your GPS coordinates) to execute the command before the package delivery truck arrives at the location of the target vehicle 252 to keep the target vehicle 252 awake so that the target vehicle 252 respond immediately to a command to unlock the door (see, for example, FIG. 7A). This improves productivity since the vehicle 252 can be opened immediately when the package delivery truck 322 arrives, since the vehicle is awake and ready to accept commands. Note, in an example, for security, cloud based system for a package-exchange-service 340 will grant access to the vehicle only once. Subsequent requests will not unlock the vehicle even if correct virtual key and valid time window are present.

Figure 7B:
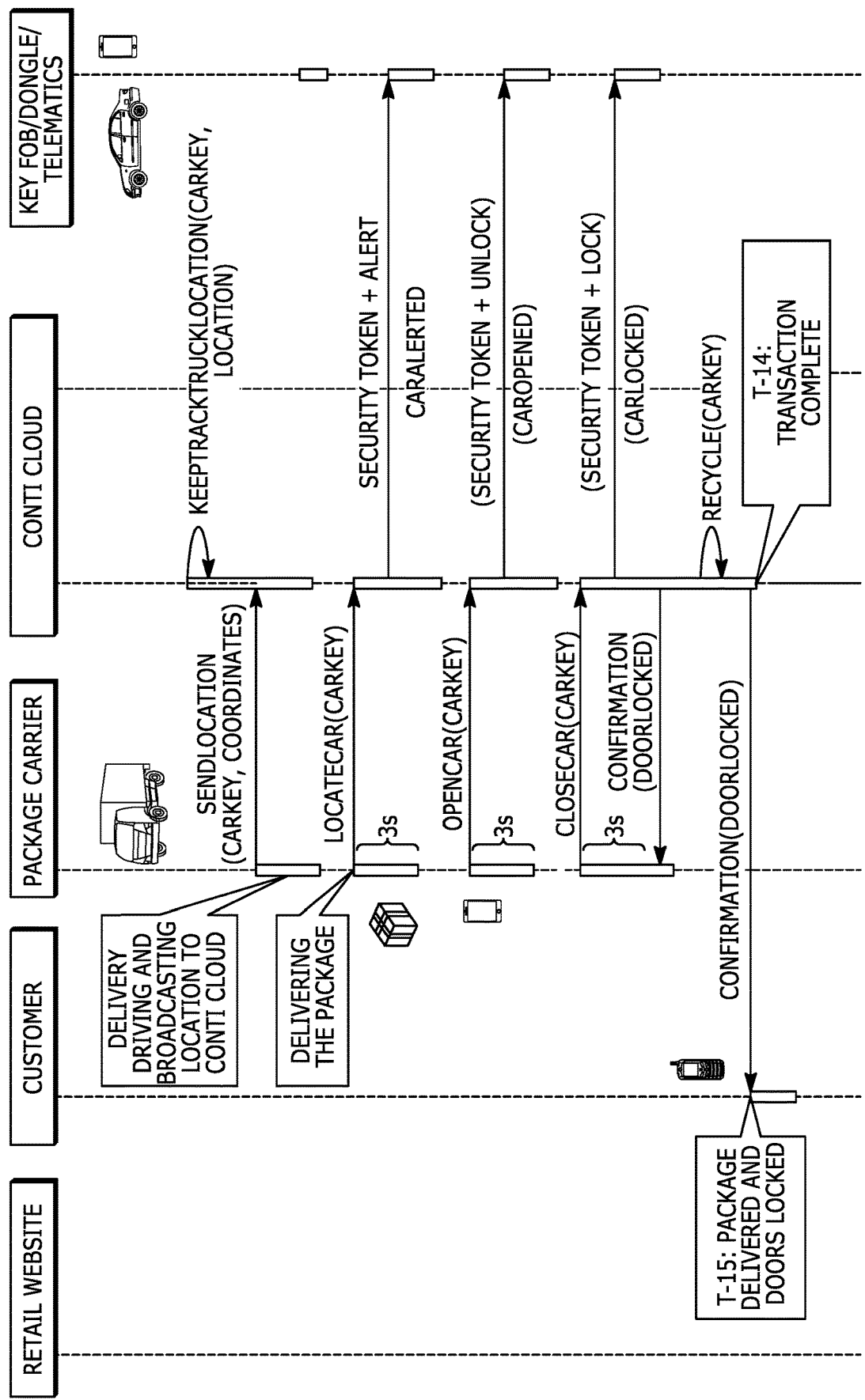
Figure 8A:
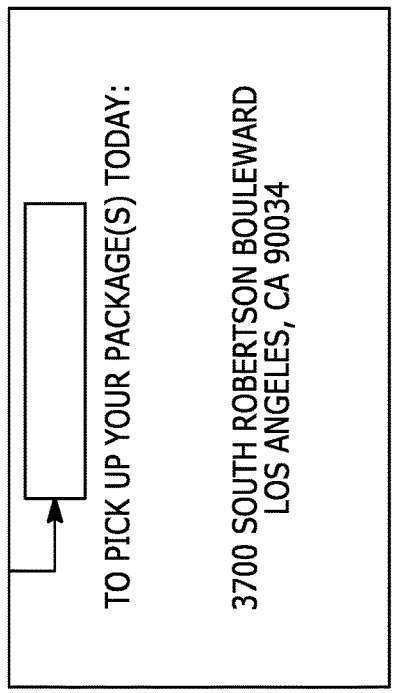
Figure 8A:
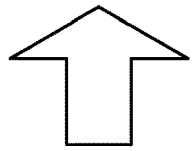
Figure 8A:
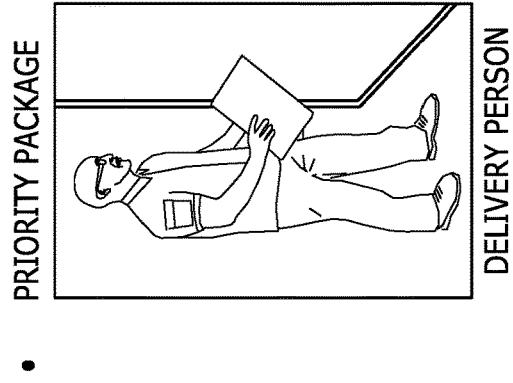
Figure 8A:
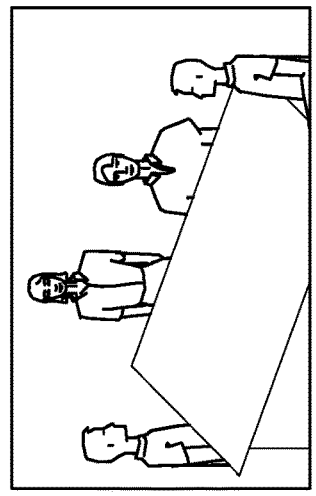
Figure 8B:
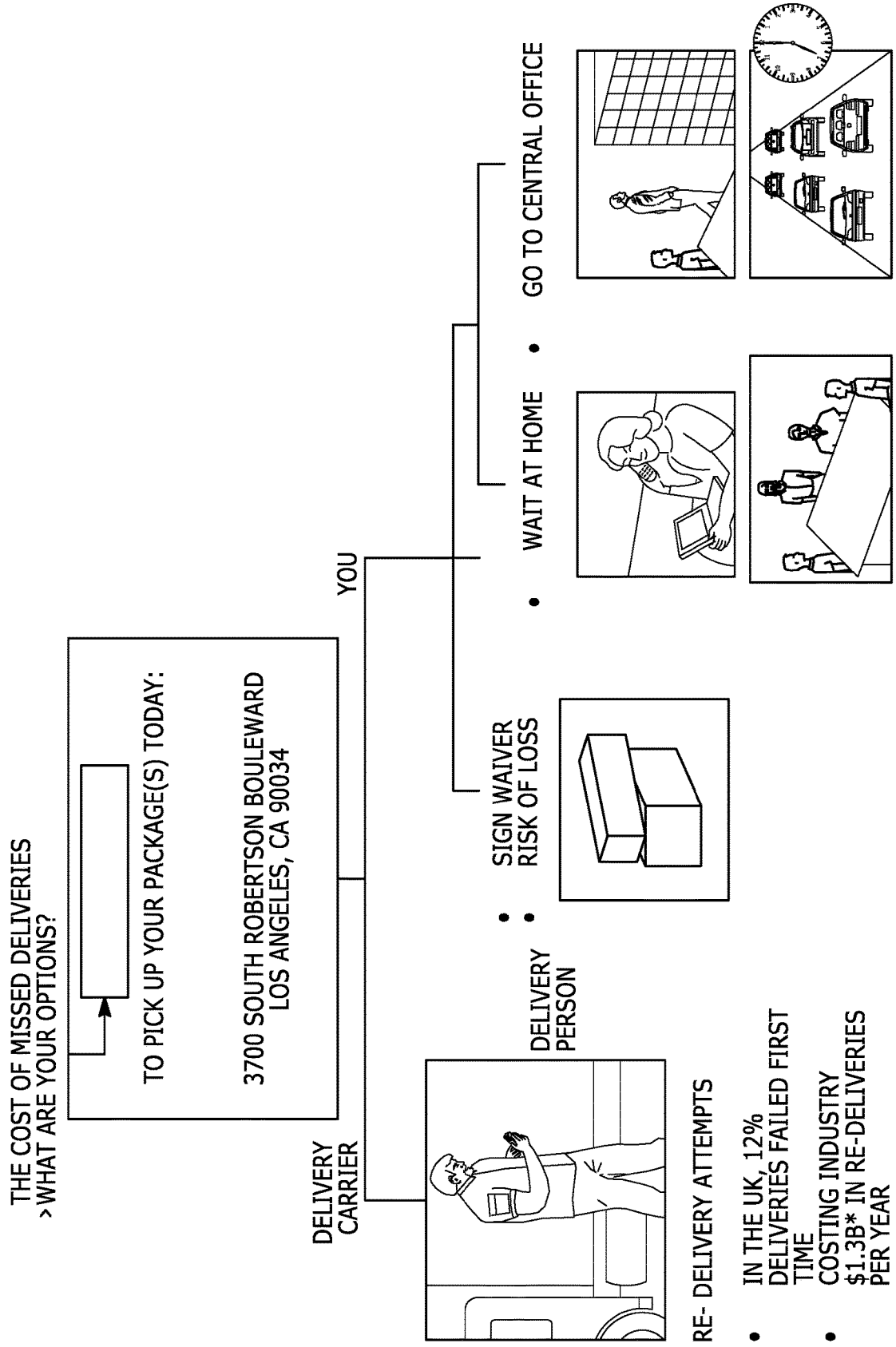
Figure 8D:
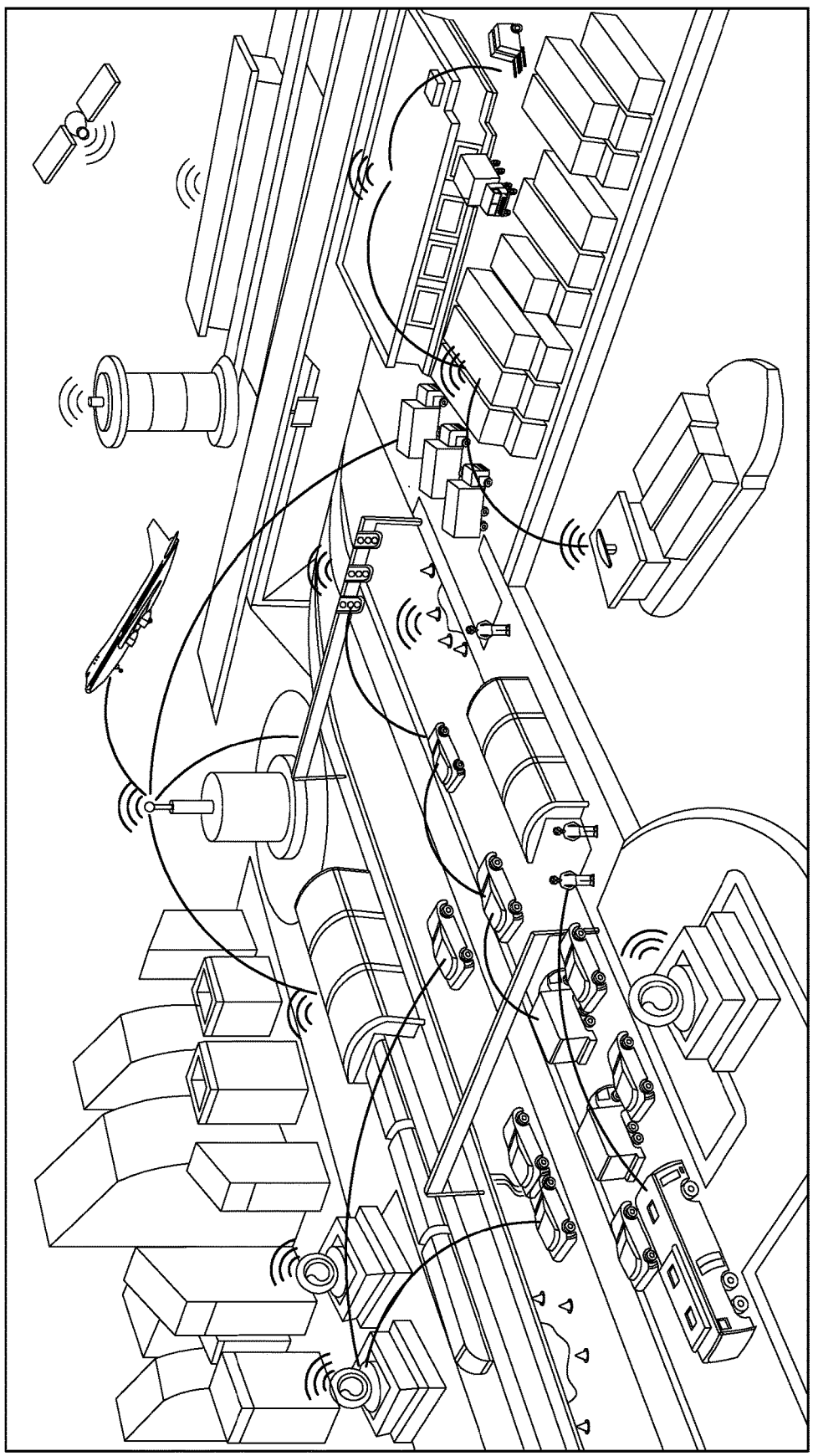
Figure 9A:
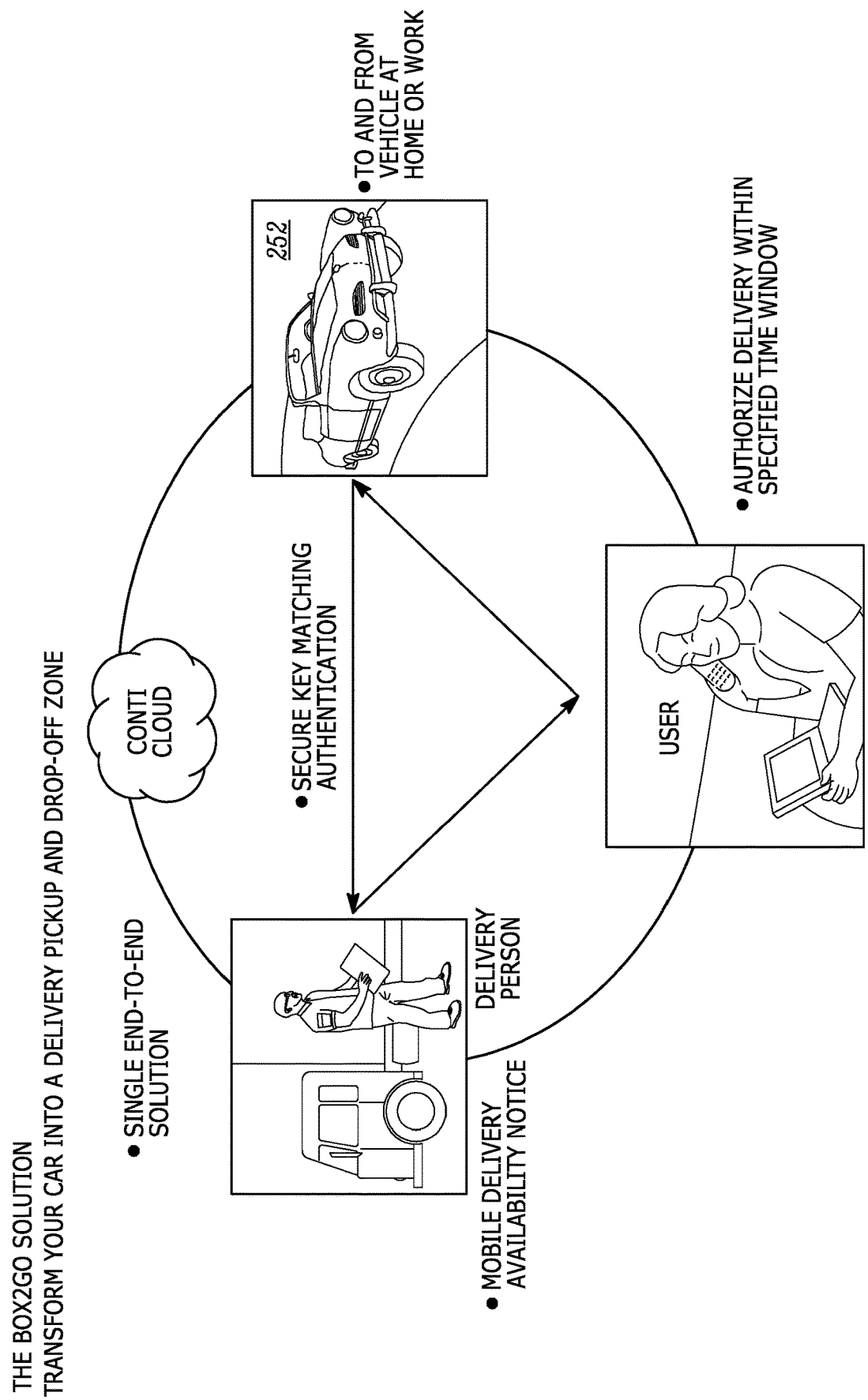
FIGS. 9A-9D illustrate block diagrams of embodiments of the multiple paired virtual keys and security authorization notices used by the package-exchange-service.
Figure 9B:
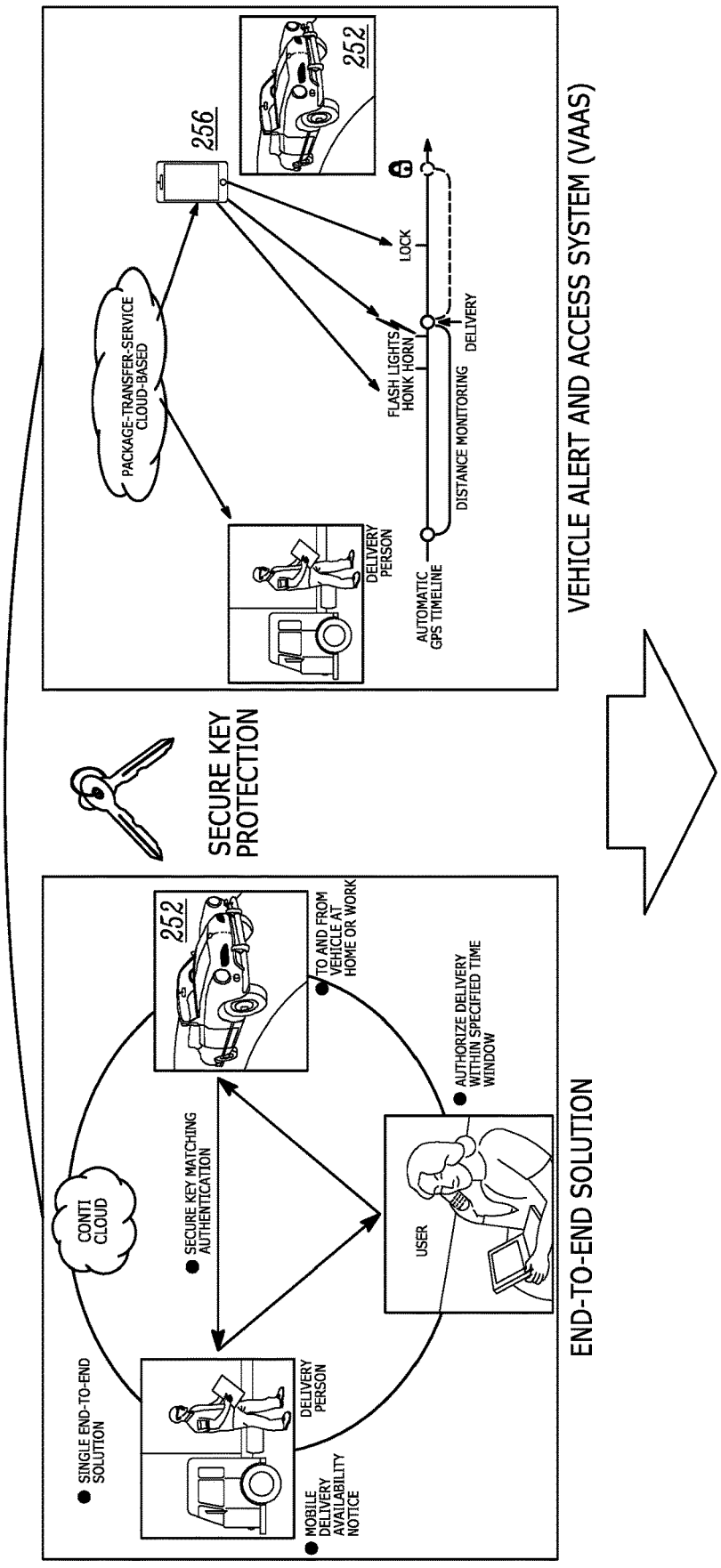
Figure 9C:
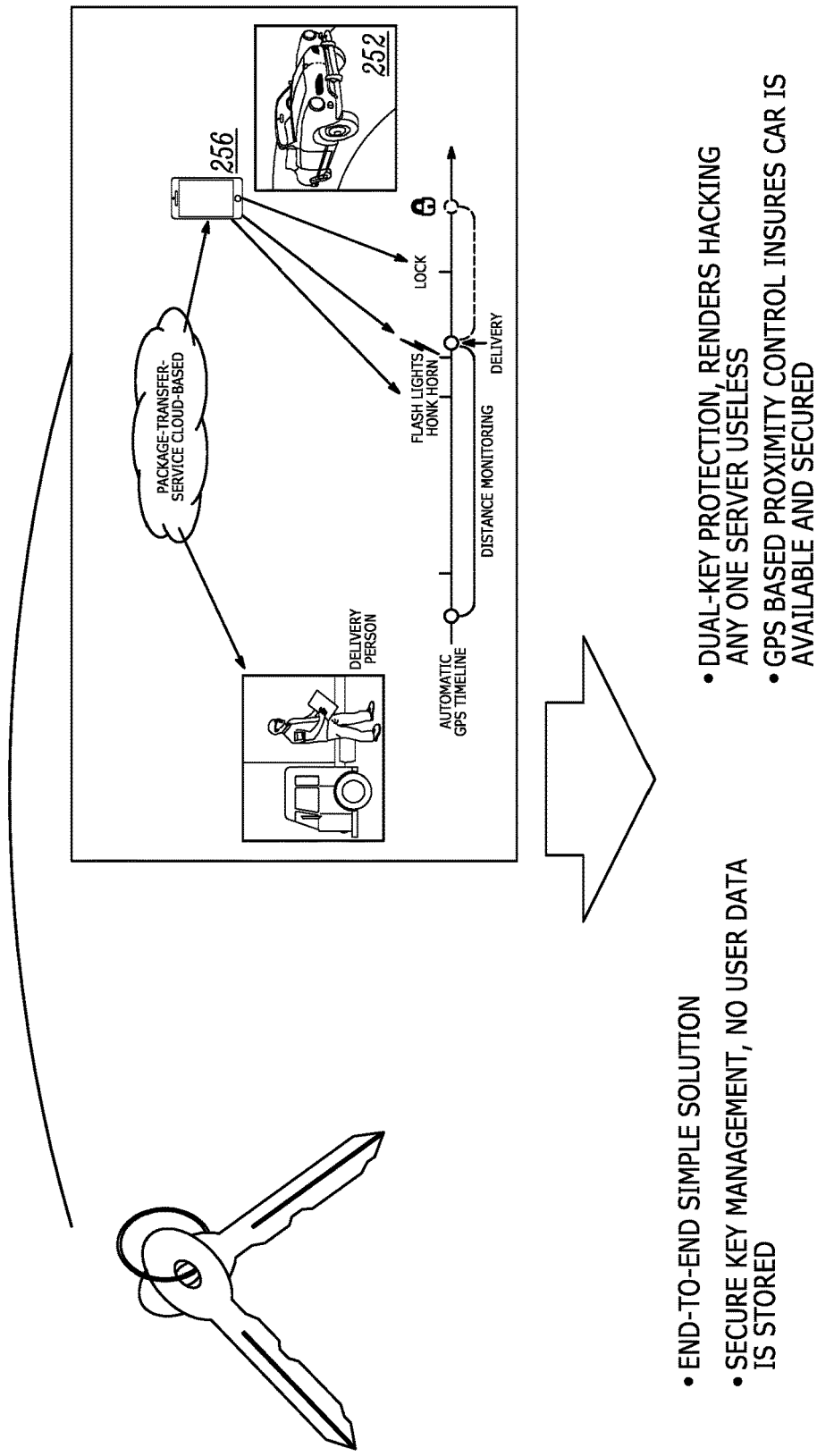
Figure 9D:
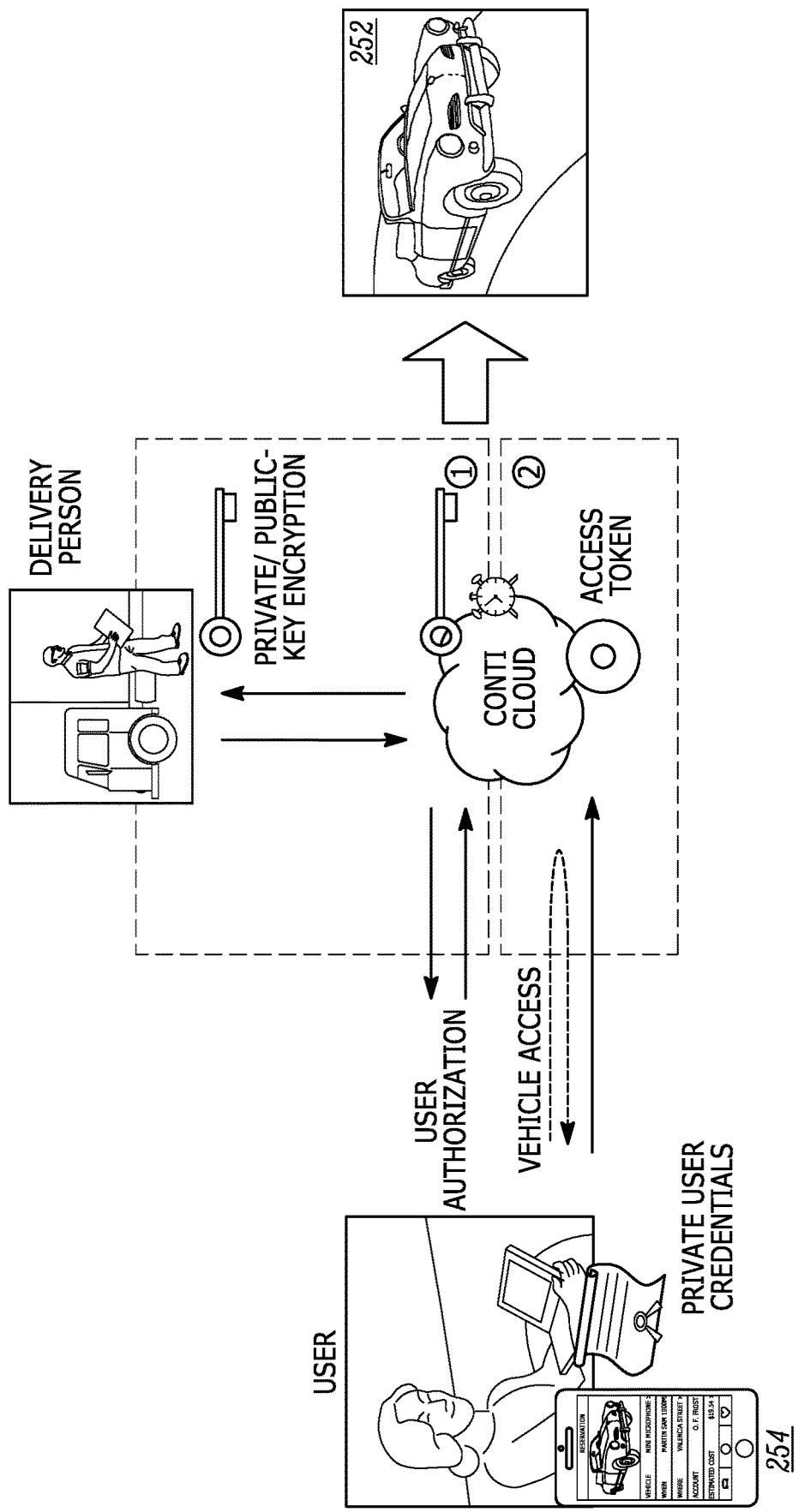

(11B) A GPS-based proximity control routine in GPS-based proximity module the cloud based system for a package-exchange-service 340 will also send a request via the one or more application programming interfaces to the telematics system OEM Backend 310 to send a command to cause a localized alert in the target vehicle so that the vehicle can blink the vehicle's lights and honk its horn to alert the delivery driver directly to the target vehicle's location (see, for example, FIG. 7A and FIG. 7B), in order to save time and aid in locating the target vehicle within rows of parked cars. Alternatively, the cloud based system for a package-exchange-service 340 itself can be scripted to send a command directly to the vehicle's telematics module to blink lights and honk its horn to alert delivery driver directly to vehicle's location. This ensures the designated target vehicle is identified properly and increases efficiency of delivering or picking up of the package.

(12) Optionally, the GPS-based proximity control routine of the cloud-based system for a package-exchange-service 340 waits for a confirmation from the package delivery application 315 that the vehicles driver 304 has located the target vehicle 252. The GPS-based proximity control routine composes a correct request command and sends the request via the one or more application programming interfaces to the telematics system OEM Backend 310 to send a command to the intelligent vehicle's telematics module in the vehicle 252 to open the trunk of the vehicle or some other electro-mechanical actuation of a window, sunroof, or other opening to a secure compartment of the target vehicle 252 for transfer of the package.

(14) The delivery person 304 sends confirmation of the package delivery/pickup and the securing of the target vehicle 252 via the delivery application 315 on the client's device to the cloud based system for a package-exchange-service 340.

(15) After receiving a confirmed delivery of the package from the package delivery application 315 in the delivery person's client device, the GPS-based proximity control routine in the cloud based system for a package-exchange-service 340 can receive GPS coordinates from the delivery application 315 in the delivery person's client device and resume monitoring the delivery person 304. The GPS-based proximity control routine performs distance monitoring to recognize when the delivery driver is departing and then is scripted to verify that the target vehicle 252 is locked and to avoid the delivery person leaving an unlocked vehicle. The package-exchange-service in the cloud system 340 checks the lock status of the target vehicle 252 by sending a request to the telematics system's OEM backend 310.

(16) As described above, the GPS-based proximity control routine in the cloud based system for a package-exchange-service 340 sends a request via the one or more application programming interfaces to the telematics system OEM Backend 310 to send a command to the intelligent telematics module in the vehicle 252 to check the lock status and to confirm the vehicle's doors/trunk is both closed and locked. The telematics system's OEM backend 310 also responds back with a lock confirmation that the vehicle's doors/trunk is both closed and locked, or does not confirm lock status. If not confirming, the GPS-based proximity control routine in the cloud based system for a package-exchange-service 340 sends a request via the one or more application programming interfaces to the telematics system OEM backend 310 to send a command to the intelligent vehicle's telematics module in the vehicle 252 to close and lock the vehicle's doors/trunk. This feature improves security to insure the vehicle 252 is locked after departure and is not left unlocked.

(17) The cloud based system for a package-exchange-service 340 sends delivery confirmation to the User on either the mobile application 254 or the desktop application 350 on their client device.

In an embodiment, the target vehicle's on-board actuation module is a telematics module that is configured to 1) send data including GPS coordinates of the target vehicle to an OEM telematics provider, and 2) receive one or more commands from the OEM telematics provider. The server of the OEM telematics provider is configured to send the GPS coordinates of the target vehicle to the cloud-based server with the GPS-based proximity module. Also, the one or more processors in the cloud based server site are configured to calculate the first threshold distance, and then issue a request to a server of the OEM telematics provider to issue the command to wake up the telematics module of the target vehicle by pinging the telematics module with intervals shorter than a predefined idle time before going to sleep of the telematics module. As an example, the idle time before going to sleep of the on-board Telematics module of the target vehicle can be between 5 to 20 minutes (e.g., 10 minutes).

In an embodiment, the target vehicle's on-board actuation module is a dongle module that is coupled to a fault and diagnostic module installed in the target vehicle of the user and is configured to retrieve diagnostic data including the current GPS coordinates of the target vehicle of the user. The on-board dongle module is configured to send the current GPS coordinates of the target vehicle of the user via a Wi-Fi or cellular communication to the GPS-based proximity module. The on-board dongle module may also include a Radio Frequency circuitry of a key fob to communicate with a local client device, such as a smart phone or hand held device, and is configured to perform the commands by transmitting RF signals that include the commands to a Body Control Module (BCM) of the target vehicle of the customer, where the security token is a rolling security key of the BCM that is included in the transmitted signals and is used by the BMC for verifying the authentication of the commands.

In an embodiment, the target vehicle's on-board actuation module is an on-board RF module having a radio frequency communication circuit configured to establish a secure communication with the security module to receive the commands and the security token via the local client device. The on-board RF module includes an RF circuitry of a key fob and is configured to perform the commands by transmitting RF signals.

In an embodiment, the on-board actuation module is an on-board telematics module coupled to a network of a telematics provider. In response to a user request and after a user login using user's credentials through the second client device to the telematics provider, the telematics provider is configured to provide the security token to the second client device of the user via a first secure communication. Before sending a command on behalf of the user to the telematics provider, the security module is configured to send the security token to a server of the telematics provider. The security token is used by a verification module running on one or more servers of a telematics provider to verify the user and target vehicle. In response to receiving the security token and after the verification, the telematics provider supplies, via a second secure communication, a second virtual key to the security module to be used for authenticating further communications from the security module to the telematics provider. The security module is configured to send the second virtual key and the commands to the telematics provider. The one or more servers of the telematics provider perform a second authentication using the second virtual key before sending the commands to the on-board telematics module in the target vehicle.

High-Level Description of the Package-Exchange-Service Processes

Figure 6A:
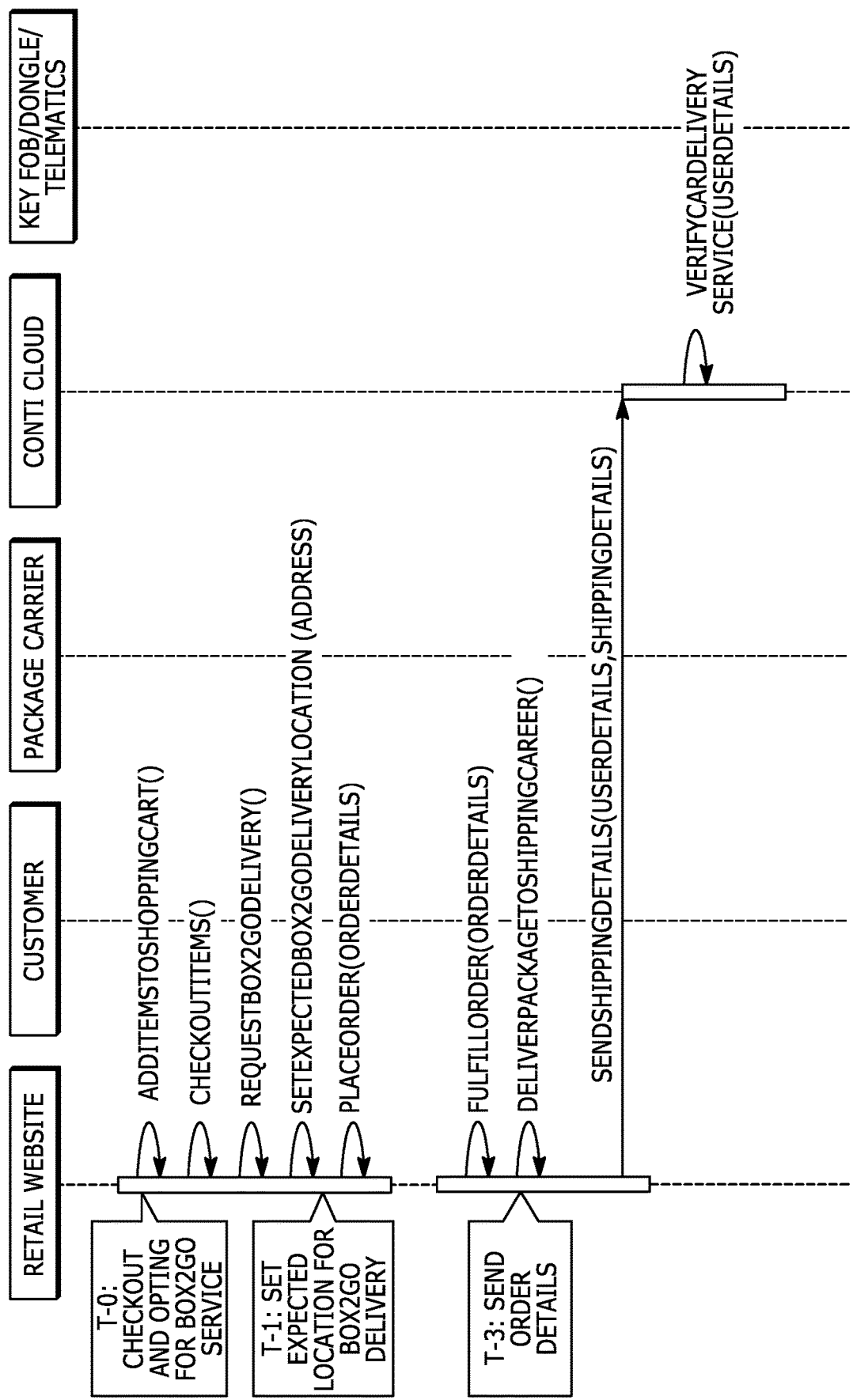
FIGS. 6A-6B illustrate flow diagrams of embodiment of the alternative delivery system.
Figure 6B:
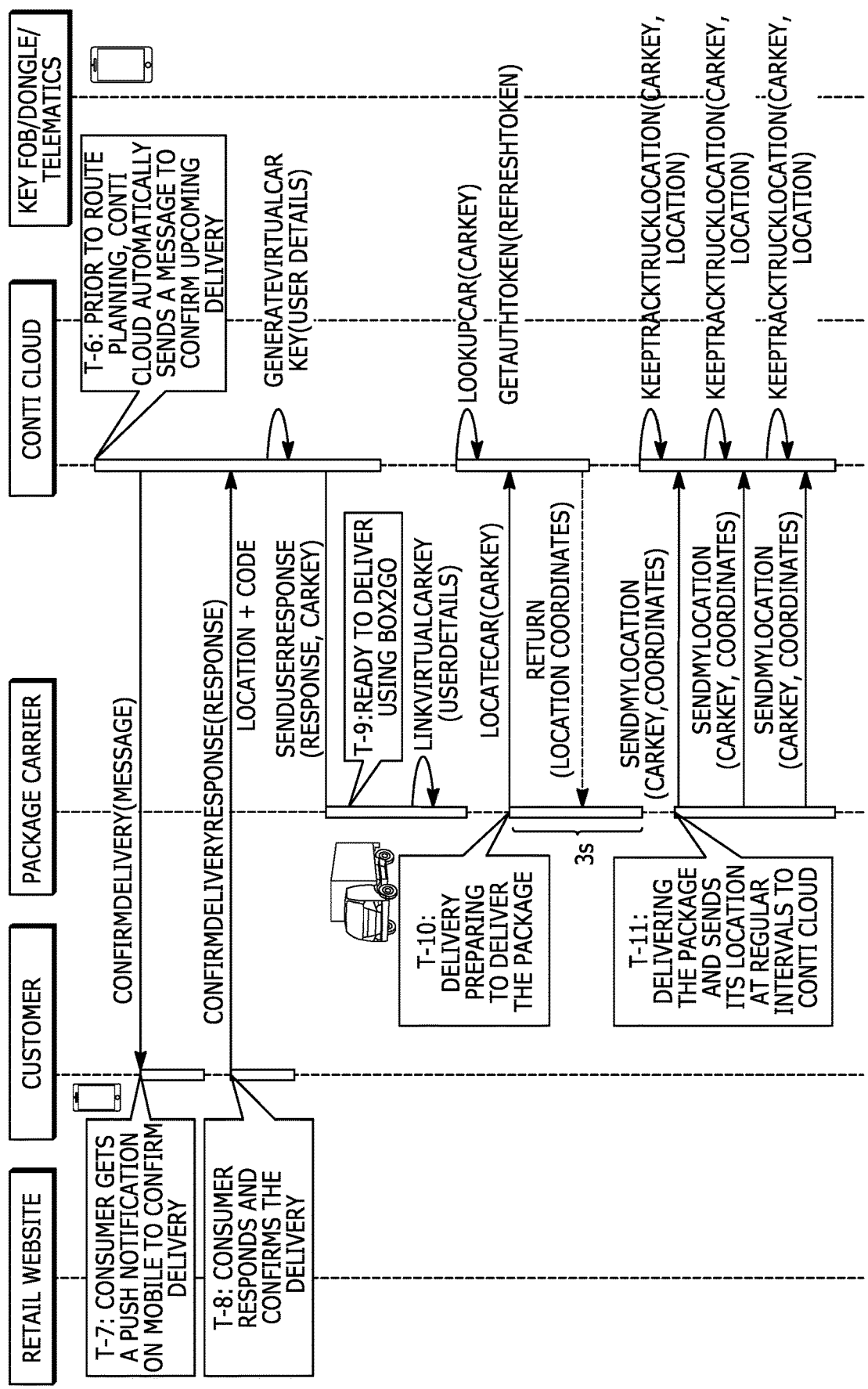
Figure 14:
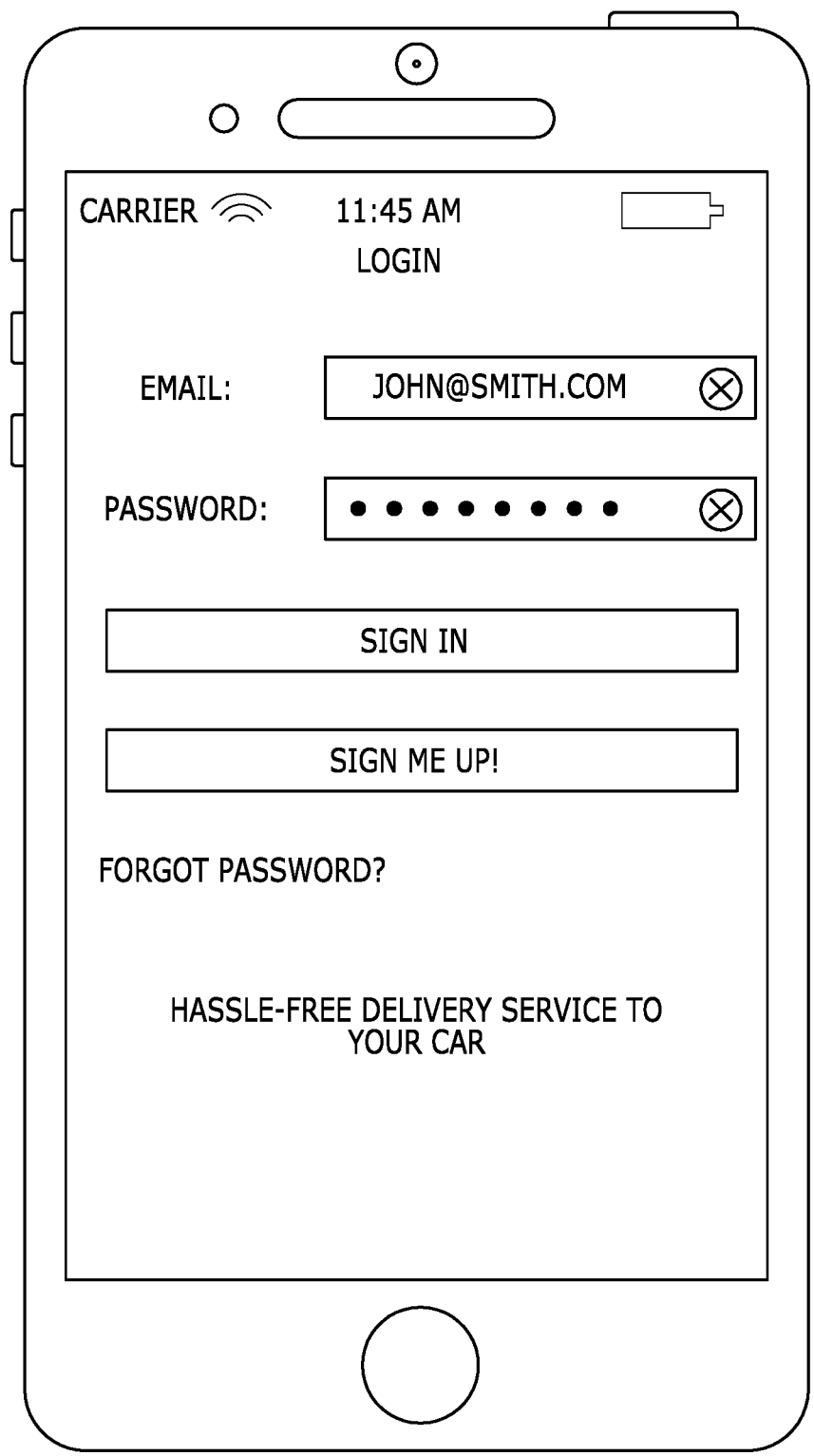
FIGS. 14-16 illustrate user interfaces of an application of a package-exchange-service with a vehicle on a client device used for signing up and logging.
Figure 15A:
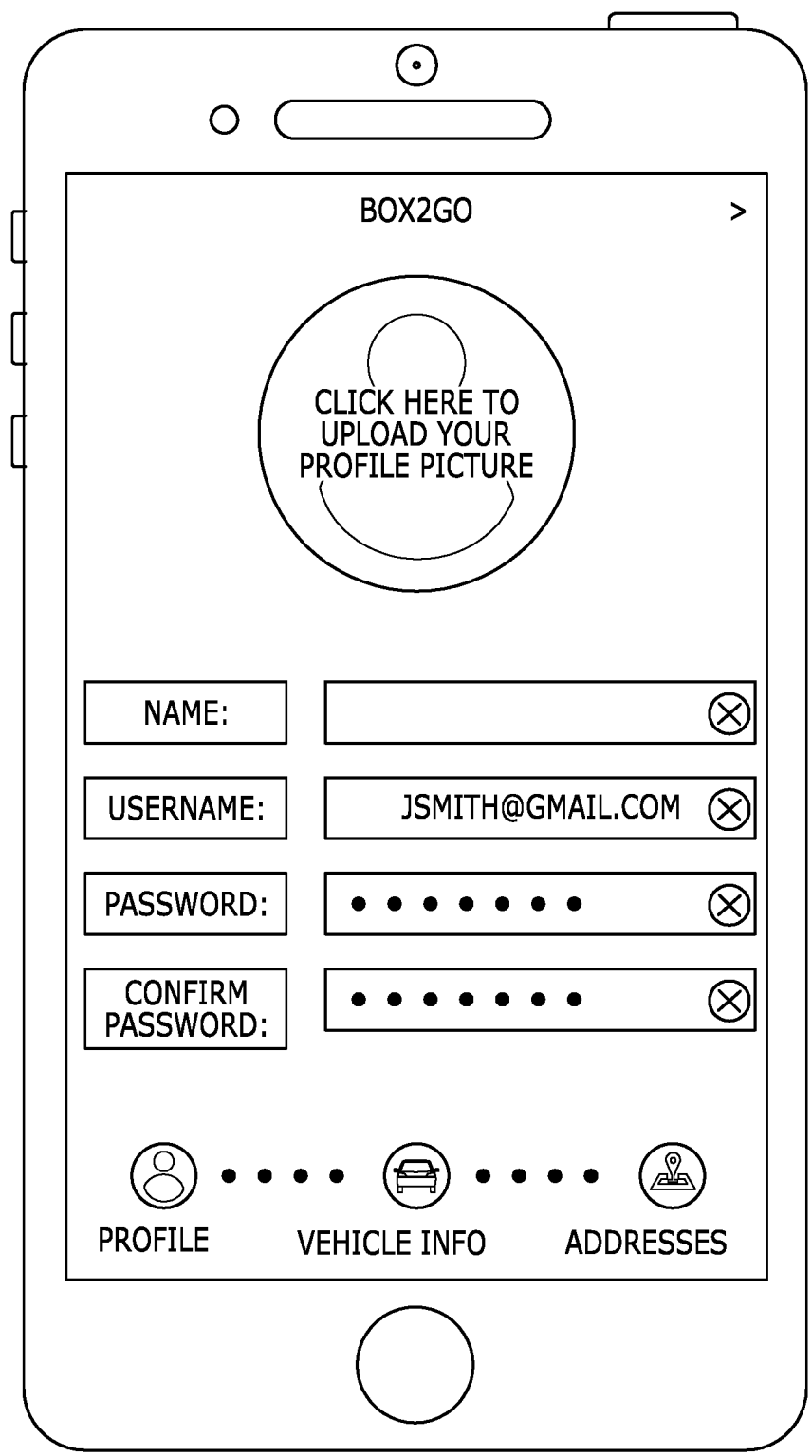
Figure 15B:
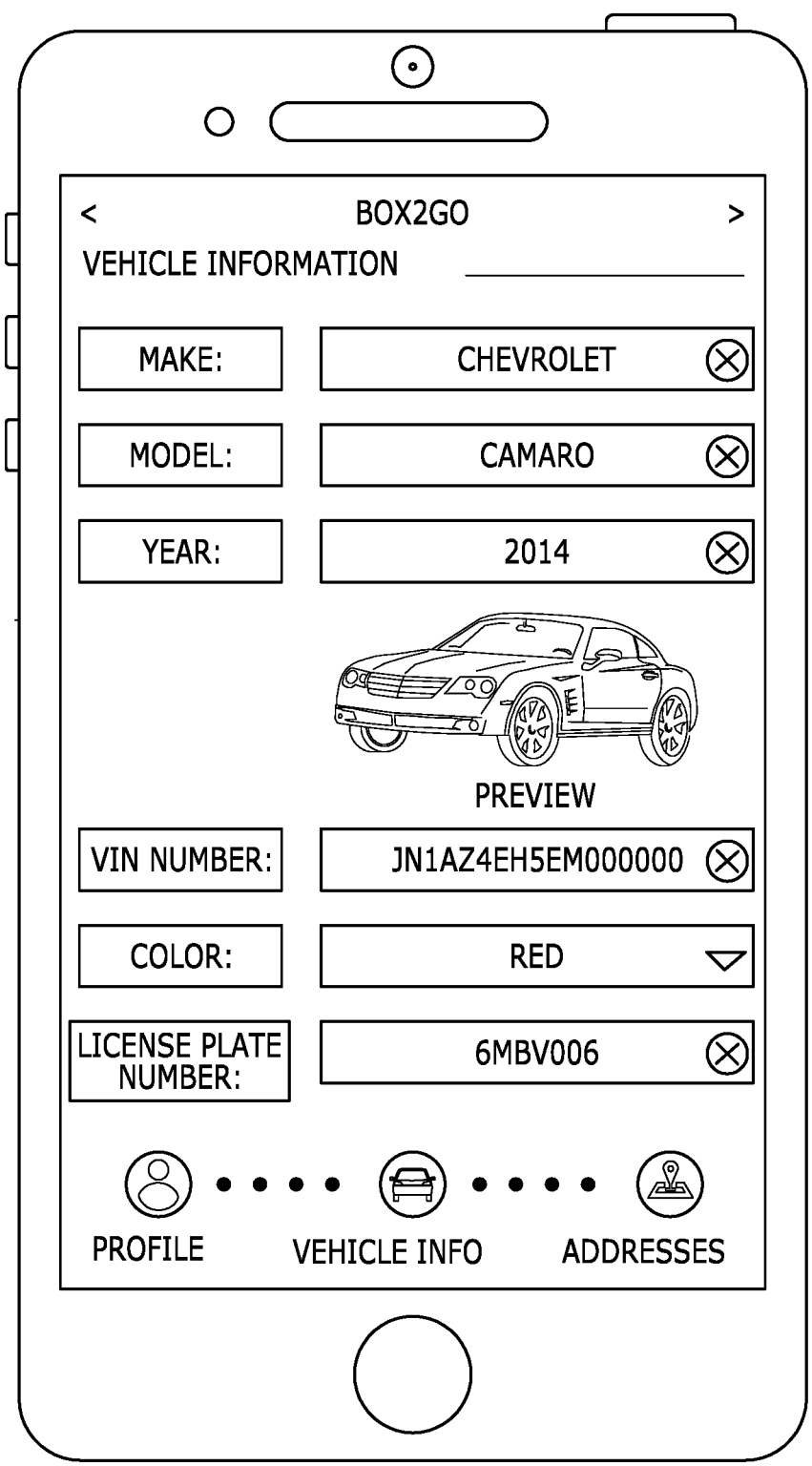
Figure 16A:
Figure 16B:
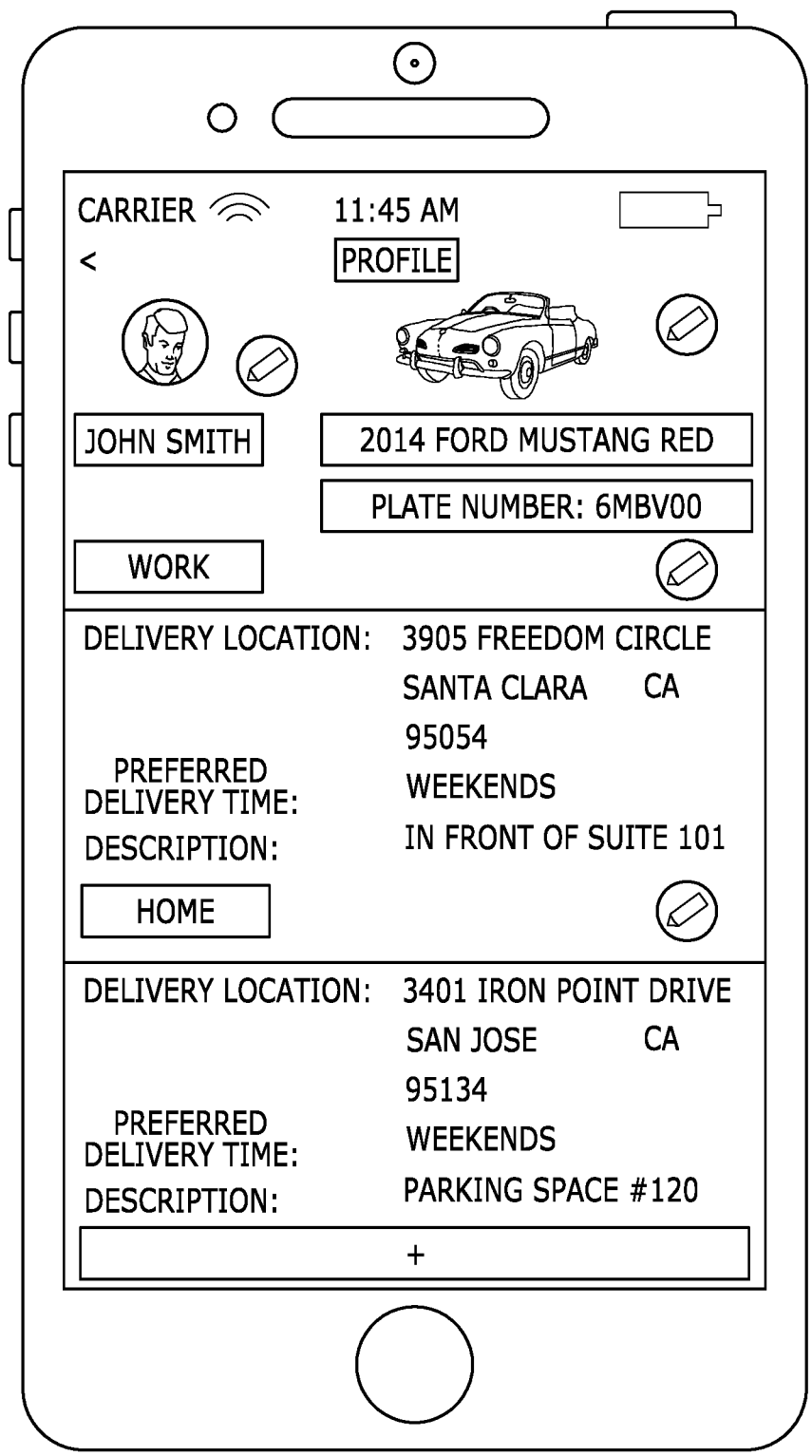

FIGS. 6A-6B illustrate flow diagrams of embodiment of the alternative delivery system.

i) Registration and purchase: There are multiple time periods and methods a customer can select to register with the package-exchange-service. Upon registering, a first database in the one or more databases may be also configured to contain and index information regarding for each user including: User ID and password for the package-exchange-service, User name, email, etc., security questions, vehicle VIN, vehicle model, color and year, and other similar information. FIGS. 14-16 illustrate steps of signing in or logging in using an application provided by the cloud based system for a package-exchange-service.

1) When purchasing a new car at the dealership: i) the customer is offered to install a dongle module associated with the cloud based system for a package-exchange-service. The new car may already have a telematics module but the dongle module can be installed in addition to the telematics module. ii) After accepting the offer of installing a dongle module or when a telematics module is already installed, the customer is offered to sign-up for the package-exchange-service, iii) the customer signs up for the Box2Go service application in the cloud-based package-exchange-service using a paper form and the customer downloads the Box2Go mobile app into their client device, iv) the customer logs-in to the Box2Go mobile app at least once to activate the Box2Go service application in the cloud-based package-exchange-service. Next, the cloud-based package-exchange-service automatically tracks the Authentication Key and Refresh Key for the user and stores it as part of the registration.

2) A customer may register using the Box2Go Application by i) using the Box2Go app to sign up, ii) When the actuation module of the target vehicle of the customer is a telematics module, Box2Go collects the registration information for the telematics system site (e.g. OnStar's Backend site), iii) the telematics system site finishes the registration and returns the Authentication Key and Refresh Key, and lastly iv) the cloud-based package-exchange-service stores the Authentication Key and Refresh Key as part of the registration.

3) When an already existing User of a telematics provider registers, the Box2Go app collects the username and password from the telematics system site customer, Box2Go signs up the customer, and the telematics system site returns the Authentication Key and Refresh Key. The cloud-based package-exchange-service can store, e.g., an encrypted version of the Authentication Key and Refresh Key as part of the registration.

4) The shopping experience may be as follows. While shopping at a retail store, at checkout, the customer will i) purchase a product on a retail website e.g. Amazon, BestBuy, eBay, etc., ii) be offered an option on the user interface to have the purchased items delivered to his car using the Box2Go service application in the cloud-based package-exchange-service, iii) selects the delivery method as "Box2Go Delivery," to have the package delivered to the vehicle, iv) optionally, selects the expected location of the vehicle to be either work or home, and v) checks-out and places the order with the retailer and then may redirect the customer to website of the cloud based system for a package-exchange-service to select a package delivery service. The retailer will fulfill the order and prepare the package for delivery and inform the cloud based system for a package-exchange-service when to pick up the package.

ii) The Box2Go Delivery Process for use cases including communications via Wi-Fi hotspots, the telematics solution, and blue tooth exchanges between the internal intelligent software in the vehicle itself and the downloaded application resident on the client device.

The security module in the server associated with the package-exchange-service is configured to communicate with the server of the merchant/retail site to receive purchase information after the checkout point and completion of the purchase by the customer. For example, an application resident on the first client device of the customer is configured to allow the customer to login to the customer's account of the package-exchange-service in order to track the delivery of the purchased products. The security module in the server associated with the package-exchange-service is configured to receive one or more customer verification requests from the servers of the one or more retail websites. In response to a customer verification request from the retail website, the security module is configured 1) to provide a login screen for the customer of the retail website. An application (e.g., a web application of the retail website) resident on the client device of the customer is redirected from the retail website to the login screen of the cloud based package-exchange-service to enter customer credentials corresponding to a customer's account of the package-exchange-service. The security module is also configured 2) to receive from the server of the retail website, the customer credentials corresponding to the customer's account of the package-exchange-service such that the customer can be verified based on the customer credentials including a username and other credentials and the verification result is sent back to the retail website. Thus, after the customer verification based on the customer credentials including a username and a password and zero or more security questions, the security module can provide a response to the server of the retail website. The response can include information regarding the services for package exchange available to the customer and the target vehicle associated with the customer. The package delivery systems and/or a list of local package delivery services that can deliver the purchased products from the retail website to the associated target vehicle of the customer.

1) For packages marked for "Box2Go Delivery", the cloud based system for a package-exchange-service initiates a query process for the delivery of the package with the package-exchange-service in the cloud. The package-exchange-service cloud verifies the customer information who requested the package delivery in its system and confirms that the customer has the Box2Go service application in the cloud-based package-exchange-service available to allow for such a delivery and also confirms the user has selected a package delivery service. The package-exchange-service cloud then sends verification back to the package delivery vehicle that the customer can accept a Box2Go delivery.

iii) Shipping Experience

Delivery Planning

1) Prior to the package delivery vehicle's route planning, the cloud-based package-exchange-service sends a push message (preferably early in the morning) to the customer's cell phone of the Customer requesting confirmation for the vehicle delivery for the package with the Order details. The Customer confirms the vehicle delivery option by sending a message back to the cloud-based package-exchange-service. The customer may notice a push-message for Box2Go application (see, for example, FIG. 12). Once the cloud-based package-exchange-service receives the customer's confirmation for the car delivery, the cloud-based package-exchange-service will generate a virtual Car Key. The cloud-based package-exchange-service sends a virtual Car Key to the package delivery vehicle. The virtual Car Key is issued with a limited shelf life and will expire even if not used within a defined amount of time, such as 4 hours. Note, the dual key security protects against if either the virtual Car key or access token are compromised. The limited shelf life expiration protects against if BOTH the virtual Car Key and access token are compromised, they are only valid for a limited window of time established by the cloud-based package-exchange-service. Thus, the security of the vehicle is protected in multiple ways. The package delivery person then links the virtual Car Key to the delivery order. The package delivery vehicle is then ready to execute the package delivery to the Customer's vehicle.

A shipping and tracking module in the one or more of servers of the cloud based package-exchange-service can be configured to supply servers and databases of one or more retail websites with information regarding services for package exchange operations available to one or more customers and associated vehicles of the customers. The shipping and tracking module is configured to provide package delivery services information for the package exchange operations with a vehicle of a customer to a second server of a first retail website. The package delivery services information includes either of 1) one or more package delivery systems (e.g., FedEx) with their servers that are set up to cooperate with the servers of the package-exchange-service to deliver one or more purchased products from the first retail website to an associated target vehicle of the customer, or 2) a list of local delivery services that are registered in a database associated with the package-exchange-service. The package delivery services information which is sent from the first server of the package-exchange-service to the second server of the first retail website enables the first retail website to present a button (e.g., a button labeled "Box2Go") on a user interface of a shopping application (e.g., a web application) resident on a first client device of the customer. The first client device is coupled to the first retail website for purchasing products from the first retail website and the presented button can enable the customer at a checkout point of the purchase from the first retail website to select an alternative package delivery option of delivering the one or more purchased products to the associated target vehicle of the customer. The presented button can enable the customer at the checkout point of the purchase from the first retail website, to select one of the delivery systems or a local delivery service from the list of local delivery services.

The shipping and tracking module in the first server associated with the package-exchange-service can be configured to communicate with the second server of the first retail website to receive purchase information after the checkout point and completion of the purchase by the customer. The purchase information includes the package delivery services information regarding the customer including their name, and the target vehicle of the customer, at least one of a package delivery system or a local delivery service that is selected to exchange the purchased products with the target vehicle of the customer, and an expected delivery date and delivery location. The purchase information is stored in the one or more databases in the cloud based package-exchange-service. The shipping and tracking module is configured to cooperate with at least a first database and a first processor of the cloud based provider site to process information including a shipping Tracking Number (TN) and a Vehicle Identification Number (VIN) of the target vehicle associated with the purchase and to register the purchase information and a request for package delivery to the target vehicle of the customer in one of the databases of the cloud based provider site associated with the package-exchange-service.

Pre-Delivery

2) A package delivery vehicle may deliver more than one package to more than one location. The cloud based system for a package-exchange-service prepares the Box2Go packages to be delivered to the customer's car. The package delivery vehicle plans the delivery route based on either the address selected for Box2Go delivery at the time of checkout or the current location of the vehicle. On delivery day, the package delivery vehicle looks up the virtual Car Key associated with the order in the Box2Go app. The package delivery vehicle contacts the cloud-based package-exchange-service to get the location of the target car. The cloud-based package-exchange-service then receives the last known location of the car and sends it back to the package delivery vehicle's Box2Go app. If the current location of the vehicle is in his delivery zone, the package delivery vehicle moves ahead with the delivery. If the vehicle to deliver to is not in the delivery zone, then that delivery is skipped and marked for differed mail delivery.

Real-Time Tracking of the Package Delivery Vehicle.

3) While tracking the package delivery vehicle driving toward the delivery location, an application, downloadable from the cloud based system for a package-exchange-service, in the delivery vehicle can notify the cloud-based package-exchange-service of the delivery vehicle's location. The cloud-based package-exchange-service anticipates the delivery of a package to the car and can wake up the vehicle's system by issuing a command. When the package delivery vehicle approaches near the car (like 100 meters), the cloud-based package-exchange-service automatically alerts the vehicle and the vehicle starts flashing lights and beeps a few times. This helps the package delivery vehicle's driver to locate the exact vehicle in a parking lot.

4) To unlock the car once package delivery vehicle reaches the car, the application used by the delivery person uses the Box2Go app to send an Unlock command. The cloud-based package-exchange-service intercepts this command and issues an Unlock command to either of: 1) the dongle module of the target vehicle, 2) the telematics module of the target vehicle, or 3) a client device of the delivery person/vehicle. As an example, the telematics system site triggers an unlock request in the car's telematics module by sending this Unlock command to electromechanically unlock a trunk or door of the vehicle.

5) The delivery person places the package inside the customer's car, closes the car door/trunk, and then uses the Box2Go app to send a lock command. Like above, the cloud-based package-exchange-service intercepts this command and issues a Lock command to the telematics system site. The telematics system site triggers a lock request in the car's telematics module by sending the lock command.

6) A confirmation message is sent from the package-exchange-service to the customer on the Box2Go app on the customer's cell phone. The delivery process is completed when the package-exchange-service destroys the virtual CarKey for the order (see, for example, FIG. 12).

Revenue

FIGS. 8A-8D illustrate block and flow diagrams of embodiment of the value proposition of the alternative delivery system. As discussed above, the user/customer may pay an additional fee on a per delivery/per pick-up instance to use the package-exchange-service. The user/customer may pay a monthly or yearly subscription fee for all deliveries and pick-ups of packages to use the package-exchange-service. The user/customer may pay on another usage case model. A revenue sharing agreement may be in place between the retailer, the package-exchange-service, the local package delivery services, and the OEM telematics provider. The delivery service may subsidize the delivery of packages to increase volume, make package delivery more efficient, and eliminate re-delivering of packages. For example, in a survey of United Kingdom deliveries, 12% of deliveries failed first time. This costs the delivery industry $1.3 billion in re-deliveries per year. Advertisers may also subsidize the delivery of packages by placement of advertisements in the order placing and delivery process. Combinations of the above may be used in the revenue generating processes for using the package-exchange-service. The backend servers of the delivery service, the package-exchange-service, and retailer sites collect and distribute the compensation.

Package Pick-Up

In an embodiment, the cloud based package-exchange-service can perform as a retail website and provide selectable items to the customer. The cloud-based package-exchange-service can establish revenue sharing agreement with one or more retail stores and display the products of the retail stores on the cloud based package-exchange-service user interface for the customer to select.

In an embodiment, the cloud-based package-exchange-service can establish revenue sharing agreement with the registered local delivery services.

In an embodiment, a selected local delivery service is directed by the cloud based package-exchange-service to acquire the items ordered by a customer from one or more retail stores and deliver them to a target vehicle of the customer.

In an embodiment, the cloud based package-exchange-service can include one or more distribution centers such that a first group of local package delivery services transfer the packages from the one or more retail stores to the distribution centers and then a second group of package delivery services deliver the packages to the customers.

Computing System

FIG. 1 illustrates a block diagram of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine readable mediums uses include storage of information, such as computer readable instructions, data structures, other software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 1 illustrates operating system 834, other software 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 1, provide storage of computer readable instructions, data structures, other software and other data for the computing system 810. In FIG. 1, for example, hard disk drive 841 is illustrated as storing operating system 844, other software 846, and program data 847. Note that these components can either be the same as or different from operating system 834, other software 836, and program data 837. Operating system 844, other software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, a built-in Wi-Fi circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle, such as a RF access module, a key fob module, and/or a BCM module. The vehicle has hardware and software for networking between the cloud based site as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. A cellular phone with a software application can establish a connection with the vehicle's on-board diagnostic computer and/or other on-board intelligent control systems.

The system can interface with a client device, such as a mobile phone, with the on-board computing system in the vehicle. The on-board diagnostic computing device may monitor a set of operational characteristics of a vehicle and communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database.

At the point of communication negotiation, an application on the client device extracts position location information from the vehicle's navigation system and transmits the response from the vehicle's navigation system and the location to a server ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc.) and wireless connection protocols (Bluetooth, Infrared . . . etc.). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

FIGS. 2A-2B illustrate diagrams of a network environment in which the techniques described may be applied. The network environment 200 has a communications network 220 that connects server computing systems 204A through 204D, and at least one or more client computing systems 200A to 200D. As shown, there may be many server computing systems 204A through 204D and many client computing systems 200A through 200D connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 200A and the server computing system 204A can both initiate and respond to communications, their communication may be viewed as peer-to-peer. Likewise, communications between the client computing systems 200A and 200B, and the server computing systems 204A and 204B may be viewed as peer-to-peer if each such communicating device is capable of initiation and response to communication. Additionally, server computing systems 204A-204D also have circuitry and software to communication with each other across the network 220. One or more of the server computing systems 204A to 204D may be associated with a database such as, for example, the databases 206A to 206D. Each server may have one or more instances of a virtual server running on that physical server and multiple virtual instances may be implemented by the design. A firewall may be established between a client computing system 200A and the network 220 to protect data integrity on the client computing system 200A. Each server computing system 204A-204D may have one or more firewalls.

FIGS. 2A and 2B illustrate block diagrams of an embodiment of a cloud-based package-exchange-service hosted on the cloud-based provider site that automates a package delivery to and pick up from the vehicle process. The cloud-based package-exchange-service is hosted on a cloud-based provider site that contains one or more servers and one or more databases.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud based site is given a virtual amount of dedicated space and bandwidth in the cloud. Cloud applications can be different from other applications in their scalability—which can be achieved by cloning tasks onto multiple virtual machines at run-time to meet changing work demand. Load balancers distribute the work over the set of virtual machines. This process is transparent to the cloud user, who sees only a single access point.

The cloud-based package-exchange-service is coded to utilize a protocol, such as Hypertext Transfer Protocol (HTTP), to engage in a request and response cycle with both a mobile device application resident on a client device as well as a web-browser application resident on the client device. The cloud-based package-exchange-service has one or more routines to automate a package delivery to and pick up from the vehicle process. The cloud-based package-exchange-service can be accessed by a mobile device, a desktop, a tablet device and other similar devices, anytime, anywhere. Thus, the cloud-based package-exchange-service hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based package-exchange-service, and 5) combinations of these.

The cloud-based package-exchange-service has one or more application programming interfaces (APIs) with two or more of the OEM 'remote access/connectivity' systems, such as telematics system sites, such as OnStar, Lexus Linksys, Ford Sync, Uconnect, MBConnect, BMWConnect, etc. The APIs may be a published standard for the connection to each OEM 'remote access/connectivity' system. Optionally, the cloud-based package-exchange-service has two or more application programming interfaces with the package delivery entity sites, such as FedEx, UPS, etc. The APIs may also be an open source API. One or more of the API's may be customized to closed/non-published APIs of a remote access/connectivity' site and/or package delivery entity site. The cloud-based package-exchange-service is coded to establish a secure communication link between each package delivery entity site and the cloud provider site. The cloud-based package-exchange-service is coded to establish a secure communication link between each telematics system site and the cloud provider site. The software service is coded to establish the secure communication link by creating a tunnel at the socket layer and encrypting any data while in transit between each package delivery entity sites and the provider site as well as to satisfy any additional authentication mechanisms required by the direct lending institution, including but not limited to IP address white listing and token based authentication.

In an embodiment, the server computing system 204 may include a server engine, a web page management component, a content management component and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 204A, causes the server computing system 204A to display windows and user interface screens on a portion of a media space, such as a web page. A user via a browser from the client computing system 200A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 200A or any equivalent thereof. For example, the client mobile computing system 200A may be a smart phone, a touch pad, a laptop, a netbook, etc. The client computing system 200A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 200A. The applications then serve pages that allow entry of details and further pages that allow entry of more details.

Telematics System

The telematics system uses telecommunications, vehicular technologies, electrical sensors, instrumentation, and wireless communications modules to allow communication with between the cloud and a vehicle. The telematics system site sends, receives and stores information via a telematics module to affect control on objects in the vehicle. Telematics includes but is not limited to Global Positioning System technology integrated with computers and mobile communications technology in automotive navigation systems. Telematics also includes cloud-based interaction with an integrated hands-free cell phone system in the vehicle, wireless safety communication system in the vehicle, and automatic driving assistance systems.

A wireless communication circuit exchanges communication between the mobile client device and the vehicle. The wireless communication circuit executes instructions with the processor via a bus system. The wireless communication circuit can be configured to communicate to RF (radio frequency), satellites, cellular phones (analog or digital), Bluetooth®V, Wi-Fi, Infrared, Zigby, Local Area Networks (LAN), WLAN (Wireless Local Area Network), or other wireless communication configurations and standards. The wireless communication circuit allows the vehicle's intelligence systems such as the telematics module and other diagnostic tools to communicate with other devices wirelessly. The wireless communication circuit includes an antenna built therein and being housed within the housing or can be externally located on the housing.

The Telecommunications and Informatics applied in wireless technologies and computational systems may be based on 802.11p. The IEEE standard in the 802.11 family and also referred to as Wireless Access for the Vehicular Environment (WAVE) is the primary standard that addresses and enhances Intelligent Transportation System.

An example telematics module sends commands and exchanges information other electronic circuits, electromechanical devices, and electromagnetic devices in the vehicle. The telematics module may operate in conjunction with computer-controlled devices and radio transceivers to provide precision repeatability functions (such as in robotics artificial intelligence systems) and emergency warning performance systems located in and exchanged between vehicles.

Additional intelligent vehicle technologies are car safety systems and self-contained autonomous electromechanical sensors to generate warnings that can be transmitted within a specified targeted area of interest, say within 100 meters of the emergency warning system for vehicles transceiver. In ground applications, intelligent vehicle technologies are utilized for safety and commercial communications between vehicles or between a vehicle and a sensor along the road.

The wireless communication circuits in the vehicle or in a client device are configured to give access to the mobile Internet via a cellular telephone service provider. The mobile Internet is wireless access that hands off the mobile client device or vehicle from one radio tower to another radio tower while the vehicle or device is moving across the service area. Also, in some instances, Wi-Fi may be available for users on the move so that a wireless base station connects directly to an Internet service provider, rather than through the telephone system.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud-based package-exchange-service are configured to collect and provide features such as those described herein.

Any application and other scripted code components may be stored on a non-transitory computing machine-readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol—HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

The invention claimed is:

1. A cloud based system for package exchange to and from a target vehicle, comprising:
   a cloud based package-exchange-service hosted on a cloud based provider site that includes one or more servers each having one or more processors, the servers are configured to communicate with one or more databases in the cloud based provider site;
   one or more local delivery sites, each with one or more servers each having one or more processors, the servers are configured to communicate with the servers of the cloud based package exchange service to facilitate a delivery of one or more packages to one or more target vehicles, where the servers of the one or more local delivery sites and the servers of the cloud based package-exchange-service are configured to exchange information including user information, package information, store information, vehicle information and expected vehicle location information; a GPS-based proximity module in a first server associated with package-exchange-service is configured to receive both current GPS coordinates of a package delivery vehicle and current GPS coordinates of the target vehicle of a customer for at least one package exchange operation to the target vehicle of the customer and to store both GPS coordinates in a first database of the cloud based provider site, wherein the GPS-based proximity module is configured to monitor a distance between the package delivery vehicle and the target vehicle of the customer; a delivery module in the first server associated with a second database of the cloud based system includes a first list of local delivery services, the first list of local delivery services includes registered individuals to be assigned to package exchange operations, where the first list of local delivery services also includes package delivery restrictions and conditions including package size, hours of operation, distance to operate, and delivery prices, where the customer is configured to search and select a local delivery service;
   a security module in the first server associated with the package-exchange-service is configured to setup the at least one package exchange operation including 1) directing the package delivery vehicle to the target vehicle of the customer, 2) opening and/or unlocking the target vehicle of the customer to ensure the at least one package exchange operation can be performed with the target vehicle of the customer, 3) ensuring the at least one package exchange operation have been performed, and 4) after performing the at least one package exchange operation, ensuring the target vehicle of the customer is closed and locked and the at least one package exchange operation is complete;
   where the security module in cooperation with the GPS-based proximity module is further configured to send to the target vehicle of the customer one or more functional commands 1) to wake-up an on-board actuation module in the target vehicle of the customer while in a close proximity established by a first threshold distance between the package delivery vehicle and the target vehicle of the customer, 2) to give an alert from the target vehicle of the customer while in a close proximity established by a second threshold distance between the package delivery vehicle and the target vehicle of the customer, 3) to unlock a door of the target vehicle of the customer, and 4) to lock the doors of the target vehicle of the customer after receiving a confirmation of a completion of the at least one package exchange operation;

wherein the security module is configured to receive a first virtual key via a first port and one of 1) a request for the package-exchange-service, 2) data, or 3) both, from a first client device associated with the package delivery vehicle, where the first virtual key having a first shelf life and is stored in a first database of the cloud based system, and where the first virtual key is used by the security module for a first authentication of communications from the first client device;

where the security module is further configured to receive a security token associated with both a customer and the target vehicle from a second client device associated with the customer, the security token having a second shelf life, where the security token is used for a verification of the customer and target vehicle; and wherein the security module is configured to send to any of i) the first client device, ii) one or more application programming interfaces of a server of a third party site or iii) internally to another module within the cloud based system for a package-transfer-service, the security token for verification and the one or more functional commands regarding the target vehicle to be executed, after the first authentication and in an overlap window of time between the first shelf life and the second shelf life, where the security module is configured to send the one or more functional commands regarding the vehicle 1) based on the request from the first client device, or 2) initiated by the security module, where the security module is configured to send the one or more functional commands regarding the vehicle over a network to either a local client device or over the network via the one or more application programming interfaces of the server of third party site to an on-board actuation module installed in the target vehicle, where in response to the commands, the on-board actuation module is configured to cause an electro-mechanical operation in the target vehicle to any of i) open up a door, a window, or a trunk of the target vehicle, ii) unlock the door or the trunk of the target vehicle, and iii) any combination of these two, so that the package delivery service can perform the at least one package exchange operation with the target vehicle.

2. The cloud based system of claim 1, wherein the on-board actuation module is one of:

1) an on-board telematics module coupled to a network of a telematics provider, where using customer's credentials and after a customer login through the second client device to the telematics provider, in response to a customer request, the telematics provider is configured to provide the security token to the second client device of the user via a first secure communication; wherein before sending a command on behalf of the customer to the telematics provider, the security module is configured to send the security token to a server of the telematics provider, where the security token is used by a verification module running on one or more servers of a telematics provider to verify the customer and target vehicle, where in response to receiving the security token and after the verification, the telematics provider supplies, via a second secure communication, a second virtual key to the security module to be used for authenticating communications from the security module to the telematics provider; and wherein the security module is configured to send the second virtual key and the functional commands to the telematics provider, where the one or more servers of the telematics provider perform a second authentication using the second virtual key before sending the functional commands to the on-board telematics module in the target vehicle;

2) an on-board dongle module having a Wi-Fi or cellular communication circuit configured to establish a secure communication with the security module to receive the commands and the security token via the local client device, where the on-board dongle module includes an RF circuitry of a key fob and is configured to perform the commands by transmitting RF signals that include the commands to a Body Control Module (BCM) of the target vehicle of the customer, where the security token is a rolling security key of the BCM that is included in the transmitted signals and is use by the BMC for verifying the authentication of the commands; or 3) an on-board RF module having a radio frequency communication circuit configured to establish a secure communication with the security module to receive the commands and the security token via the local client device, where the on-board RF module includes an RF circuitry of a key fob and is configured to perform the commands by transmitting RF signals.

3. The cloud based system of claim 2, wherein the current GPS coordinates of the package delivery vehicle is transmitted from a GPS-based delivery application resident in the first client device associated with a package delivery vehicle, the first client device residing 1) in the package delivery vehicle, or 2) in a handheld tool that travels with a delivery person of the package delivery vehicle, where the GPS-based delivery application transmits the current GPS coordinates of the package delivery vehicle along with the first virtual key for authentication, where the GPS-based delivery application is downloadable or otherwise electronically distributed to the first client device from a database in the cloud based provider; wherein when the on-board actuation module of the target vehicle is the on-board telematics module, the on-board telematics module is configured to send the current GPS coordinates of the target vehicle to the server of the telematics provider, and wherein server of the telematics provider is configured to send the GPS coordinates of the target vehicle to the cloud based system having the GPS-based proximity module, where the data is transmitted, via a secure communication, from the telematics provider to the GPS-based proximity module; wherein when the on-board actuation module of the target vehicle is the on-board dongle module, the on-board dongle module is coupled to a fault and diagnostic module installed in the target vehicle of the customer and is configured to retrieve diagnostic data including the current GPS coordinates of the target vehicle of the customer, the on-board dongle module is configured to send the current GPS coordinates of the target vehicle of the customer via a Wi-Fi or cellular communication and the local client device to the GPS-based proximity module; and wherein when the on-board actuation module of the target vehicle is an on-board RF module, the current GPS coordinates of the target vehicle is calculated by the second client device of the customer at an instance the target vehicle is locked, where the current GPS coordinates are uploaded from the second client device of the customer through the cellular communication to the GPS-based proximity module.

4. The cloud based system of claim 3, wherein a shipping and tracking module in the one or more of servers of the cloud based package-exchange-service is configured to supply servers and databases of one or more retail websites with information regarding services for package exchange operations available to one or more customers and associated vehicles of the customers, where the shipping and tracking module is configured to provide package delivery services information for the package exchange operations with a vehicle of a customer to a second server of a first retail website, the package delivery services information includes either of 1) one or more package delivery systems with their servers that are set up to cooperate with the servers of the package-exchange-service to deliver one or more purchased products from the first retail website to an associated target vehicle of the customer, or 2) the first list of local delivery services, where the package delivery services information which is sent from the first server of the package-exchange-service to the second server of the first retail website enables the first retail website to present a button on a user interface of a shopping application resident on a first client device of the customer, the first client device is coupled to the first retail website for purchasing products from the first retail website, where the presented button is configured to enable the customer at a checkout point of the purchase from the first retail website, to select an alternative package delivery option of delivering the one or more purchased products to the associated target vehicle of the customer, where the presented button is configured to also enable the customer at the checkout point of the purchase from the first retail website, to select one of the delivery systems or a local delivery service from the first list of local delivery services; the shipping and tracking module in the first server associated with the package-exchange-service is configured to communicate with the second server of the first retail website to receive purchase information after the checkout point and completion of the purchase by the customer, the purchase information includes the package delivery services information regarding the customer including their name, and the target vehicle of the customer, at least one of a package delivery system or a local delivery service that is selected to exchange the purchased products with the target vehicle of the customer, and an expected delivery date and delivery location, where the purchase information is stored in the one or more databases in the cloud based provider site, wherein the shipping and tracking module is configured to cooperate with at least a first database and a first processor of the cloud based provider site to process information including a shipping Tracking Number (TN) and a Vehicle Identification Number (VIN) of the target vehicle associated with the purchase and to register the purchase information and a request for package delivery to the target vehicle of the customer in one of the databases of the cloud based provider site associated with the package-exchange-service.

5. The system of claim 3, wherein the security module in the first server associated with the package-exchange-service is configured to receive one or more customer verification requests from the servers of the one or more retail websites; wherein in response to a first customer verification request from a first retail website, the security module is configured 1) to provide a login screen for the customer of the first retail website, where the shopping application resident on the first client device of the customer is redirected from the first retail website to the login screen of the cloud based provider site of the package-exchange-service to enter customer credentials corresponding to a customer's account of the package-exchange-service, or 2) to receive from the second server of the first retail website, the customer credentials corresponding to the customer's account of the package-exchange-service; and wherein after the customer verification based on the customer credentials including a username and a password and zero or more security questions, the security module provides a response to the second server of the first retail website, where the response includes information regarding the services for package exchange available to the customer and the target vehicle associated with the customer, a list of local package delivery services and package delivery systems that can deliver the purchased products from the first retail website to the associated target vehicle of the customer.

6. The cloud-based system of claim 3, where in the customer is configured to bid for the price of local delivery services.

7. The cloud based system of claim 1, further including a pool of virtual keys including one or more public keys and associated private keys in at least one database of the cloud based server, where the first virtual key is a public key from the pool of virtual keys supplied by the security module, via a secure communication, to the first client device of the package delivery vehicle; wherein the first client device is configured to include the first virtual key with each communication to the security module; and wherein the first virtual key is used by the security module for the first authentication of the communications received from the first client device of the package delivery vehicle, where the first authentication includes matching the first public key with an associated first private key of the pool of virtual keys, where the first virtual key is recycled after the expiration of the first shelf life.

8. The cloud based system of claim 1, wherein the target vehicle of the customer includes a RFID reader and each package includes a separate RFID tag, where the RFID reader is configure to be activated by the actuation modulo to read RFID tags inside the target vehicle for ensuring the one or more package exchanges have been performed.

* * * * *

UNITED STATES PATENT AND TRADEMARK OFFICE
CERTIFICATE OF CORRECTION

PATENT NO. : 11,030,569 B2  
APPLICATION NO. : 15/753481  
DATED : June 8, 2021  
INVENTOR(S) : Seval Oz, Tammer Zein-El-Abedein and Yao Zhao Page 1 of 1

It is certified that error appears in the above-identified patent and that said Letters Patent is hereby corrected as shown below:

On the Title Page

Item [72], INVENTORS:  
Line 3, change "Zhao" to --Zhai--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*